United States Patent [19]
Salvas et al.

[11] Patent Number: 5,926,660
[45] Date of Patent: Jul. 20, 1999

[54] CAMERA AND MECHANICAL TIMER MECHANISM

[75] Inventors: William B. Salvas, Rochester; Ronald W. Grant, Caledonia, both of N.Y.

[73] Assignee: Eastman Kodak Company, Rochester, N.Y.

[21] Appl. No.: 08/941,778

[22] Filed: Sep. 30, 1997

[51] Int. Cl.⁶ .................................................. G03B 17/00
[52] U.S. Cl. ............................................................ 396/264
[58] Field of Search ..................................... 396/263, 264

[56] References Cited

U.S. PATENT DOCUMENTS

| | | |
|---|---|---|
| 2,694,352 | 11/1954 | Babbs . |
| 3,021,422 | 2/1962 | Ogier et al. . |
| 3,103,862 | 9/1963 | Kiper et al. . |
| 3,133,488 | 5/1964 | Fritz . |
| 3,194,140 | 7/1965 | Winkler et al. . |
| 3,256,793 | 6/1966 | Denk et al. . |
| 3,446,951 | 5/1969 | Schmidt . |
| 3,484,597 | 12/1969 | Schmidt . |
| 3,599,553 | 8/1971 | Hansen et al. . |
| 3,603,781 | 9/1971 | Kobayashi et al. . |
| 3,611,896 | 10/1971 | Aoki . |
| 3,625,128 | 12/1971 | Nomura et al. . |
| 3,680,455 | 8/1972 | Meinuger . |
| 3,732,795 | 5/1973 | Fukuda et al. . |
| 3,741,097 | 6/1973 | Fukuda et al. . |
| 3,750,549 | 8/1973 | Waaske . |
| 3,804,204 | 4/1974 | Shono . |
| 3,810,227 | 5/1974 | Tanaka . |
| 3,823,411 | 7/1974 | Hasegawa et al. . |
| 3,839,607 | 10/1974 | Ogihara . |
| 3,852,785 | 12/1974 | Ogihara et al. . |
| 3,938,170 | 2/1976 | Winkler et al. . |
| 3,964,078 | 6/1976 | Kurei et al. . |
| 3,988,752 | 10/1976 | Winkler et al. . |
| 4,096,506 | 6/1978 | Lange . |
| 4,132,471 | 1/1979 | Svatek et al. . |
| 4,148,573 | 4/1979 | Yamanaka . |

(List continued on next page.)

FOREIGN PATENT DOCUMENTS

| | | |
|---|---|---|
| 28 03 034 | 8/1978 | Germany . |
| 49-63426 | 6/1974 | Japan . |
| 61-18500 | 9/1984 | Japan . |
| 3-171125 | 7/1991 | Japan . |
| 5-210205 | 8/1993 | Japan . |
| 6-194724 | 7/1994 | Japan . |

*Primary Examiner*—Safet Metjahic
*Assistant Examiner*—J. K. Han
*Attorney, Agent, or Firm*—Robert Luke Walker

[57] ABSTRACT

A camera includes a camera body, a shutter release, a timer, and a timer release arm. The shutter release is disposed in the camera body and is movable from a stopped position to a released position. The shutter release is biased toward the released position. The mechanical timer includes: a spring, a winder, a gear train, an escapement, and a linkage. The winder is mechanically connected to the spring and is movable into a wound position to load the spring. The gear train includes input, output, and intermediate gear units. The input gear unit is driven by the spring. The intermediate gear unit is disposed in mechanical sequence between the input and output gear units. The intermediate gear unit has a lower mechanical advantage in the sequence, relative to the input and output gear units. The escapement is driven by the output gear unit. The linkage is coupled to the gear train for movement with the gear train between start an end configurations. The linkage has a stop disposed to arrest the shutter release when the linkage is in the start configuration and the shutter release is in the stopped position. The stop is free of the shutter release when the linkage is in the end configuration. The timer release arm is disposed in the camera body and is movable between first and second positions. The timer release arm stalls the intermediate gear unit when the linkage is in the start configuration and the timer release arm is in the first position. The timer release arm is displaced from the intermediate gear unit when the timer release arm is in the second position.

18 Claims, 22 Drawing Sheets

U.S. PATENT DOCUMENTS

| | | |
|---|---|---|
| 4,181,415 | 1/1980 | Uchiyama et al. . |
| 4,189,222 | 2/1980 | Maitani . |
| 4,199,235 | 4/1980 | Matsuda et al. . |
| 4,205,908 | 6/1980 | Kitai et al. . |
| 4,240,735 | 12/1980 | Maitani et al. . |
| 4,299,465 | 11/1981 | Chan . |
| 4,306,799 | 12/1981 | Johnson . |
| 4,317,625 | 3/1982 | Allen . |
| 4,318,602 | 3/1982 | Yamanaka et al. . |
| 4,319,814 | 3/1982 | Iura et al. . |
| 4,350,420 | 9/1982 | Engelsmann et al. . |
| 4,356,533 | 10/1982 | Takematsu . |
| 4,356,538 | 10/1982 | Plummer . |
| 4,359,277 | 11/1982 | Shimizu et al. . |
| 4,412,276 | 10/1983 | Blinow . |
| 4,426,142 | 1/1984 | Iura et al. . |
| 4,441,799 | 4/1984 | Enomoto . |
| 4,451,130 | 5/1984 | Yan . |
| 4,460,942 | 7/1984 | Pizzuti et al. . |
| 4,494,850 | 1/1985 | Katsuma et al. . |
| 4,500,184 | 2/1985 | Morizumi et al. . |
| 4,500,191 | 2/1985 | Yamanaka . |
| 4,557,574 | 12/1985 | Kohno et al. . |
| 4,570,203 | 2/1986 | Daniels et al. . |
| 4,681,418 | 7/1987 | Kodaira . |
| 4,711,548 | 12/1987 | Arakawa et al. . |
| 4,796,168 | 1/1989 | Peterson . |
| 4,801,960 | 1/1989 | Hansen . |
| 4,937,609 | 6/1990 | Wakabayashi et al. . |
| 4,991,063 | 2/1991 | Stoneham . |
| 5,028,943 | 7/1991 | Ishii et al. . |
| 5,047,792 | 9/1991 | Asano et al. . |
| 5,047,900 | 9/1991 | DiRisio . |
| 5,050,044 | 9/1991 | Shibayama . |
| 5,105,213 | 4/1992 | Takahashi . |
| 5,146,251 | 9/1992 | Ishii et al. . |
| 5,235,364 | 8/1993 | Ohmura et al. . |
| 5,274,411 | 12/1993 | Kwak . |
| 5,307,113 | 4/1994 | Egawa . |
| 5,317,353 | 5/1994 | Kobayashi et al. . |
| 5,402,204 | 3/1995 | Yoshimura . |
| 5,521,670 | 5/1996 | Hara et al. . |
| 5,541,688 | 7/1996 | Glogan . |
| 5,608,478 | 3/1997 | Kamoda . |

5,926,660

CAMERA AND MECHANICAL TIMER MECHANISM

CROSS REFERENCE TO RELATED APPLICATIONS

Reference is made to commonly assigned co-pending U.S. Pat. applications Ser. No. 08/941,425, entitled: CAMERA INCLUDING DUAL SIDED AUXILIARY CIRCUIT BOARD, and filed in the names of William F. Dassero and Robert J. Stanchus; Ser. No. 08/940,569, entitled: MINIATURE FLASH CIRCUIT SWITCH WITH HIGH CURRENT CAPABILITY, and filed in the names of Ronald W. Grant and William B. Salvas; Ser. No. 08/940,771, entitled: MULTIPLE FUNCTION SHUTTER BUTTON ASSEMBLY, and filed in the names of William B. Salvas, Ronald W. Grant, William F. Dassero, Dwight J. Petruchik and Donald P. McGinn; Ser. No. 08/940,725, entitled: FILL-FLASH/FLASH-DEFEAT SWITCH RETAINED BY ELECTRONIC FLASH UNIT, and filed in the names of Robert J. Stanchus and William F. Dassero; Ser. No. 08/941,525, entitled: CAMERA HAVING SELF TIMER UNWIND WITHOUT EXPOSURE, and filed in the names of William B. Salvas and William F. Dassero; Ser. No. 08/940,423, entitled: CAMERA HAVING SELF TIMER, and filed in the names of William B. Salvas, Robert J. Stanchus and William F. Dassero, each of which are assigned to the assignee of this application.

FIELD OF THE INVENTION

The invention relates to photography and photographic equipment and more particularly relates to an improved camera and mechanical self timer.

BACKGROUND OF THE INVENTION

Photographic cameras have long used self timers to allow delayed picture exposure. Simple and inexpensive mechanical self timers have remained problematic, because of the number and complexity of parts needed to actuate and deactuate the prewound timer.

It would thus be desirable to provide an improved camera and timer in which the number and complexity of parts used to actuate and deactuate the prewound timer is minimized.

SUMMARY OF THE INVENTION

The invention is defined by the claims. The invention, in its broader aspects, provides a camera and mechanical self timer. The camera includes a camera body, a shutter release, the timer, and a timer release arm. The shutter release is disposed in the camera body and is movable from a stopped position to a released position. The shutter release is biased toward the released position. The mechanical timer includes: a spring, a winder, a gear train, an escapement, and a linkage. The winder is mechanically connected to the spring and is movable into a wound position to load the spring. The gear train includes input, output, and intermediate gear units. The input gear unit is driven by the spring. The intermediate gear unit is disposed in mechanical sequence between the input and output gear units. The intermediate gear unit has a lower mechanical advantage relative to the input and output gear units in the sequence. The escapement is driven by the output gear unit. The linkage is coupled to the gear train for movement with the gear train between start an end configurations. The linkage has a stop disposed to arrest the shutter release when the linkage is in the start configuration and the shutter release is in the stopped position. The stop is free of the shutter release when the linkage is in the end configuration. The timer release arm is disposed in the camera body and is movable between first and second positions. The timer release arm stalls the intermediate gear unit when the linkage is in the start configuration and the timer release arm is in the first position. The timer release arm is displaced from the intermediate gear unit when the timer release arm is in the second position.

It is an advantageous effect of at least some of the embodiments of the invention that an improved camera and timer are provided in which the number and complexity of parts used to actuate and deactuate the prewound timer is minimized.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

The push-pull is shown in the primary position in solid lines and in the secondary position in dashed lines.

DETAILED DESCRIPTION OF THE INVENTION

The invention is directed to an improved camera that includes a self timer 300 and to the timer 300 itself. In the following, FIGS. 1–20 are generally discussed in relation to general features of the camera; and FIGS. 21–30 are discussed in relation to detailed features of the timer and related structures. It will be understood that some features shown in FIGS. 21–30 are not illustrated in the other figures, but would be incorporated in a camera of the invention in a manner consistent with the disclosure of those features presented herein.

Figure 1:
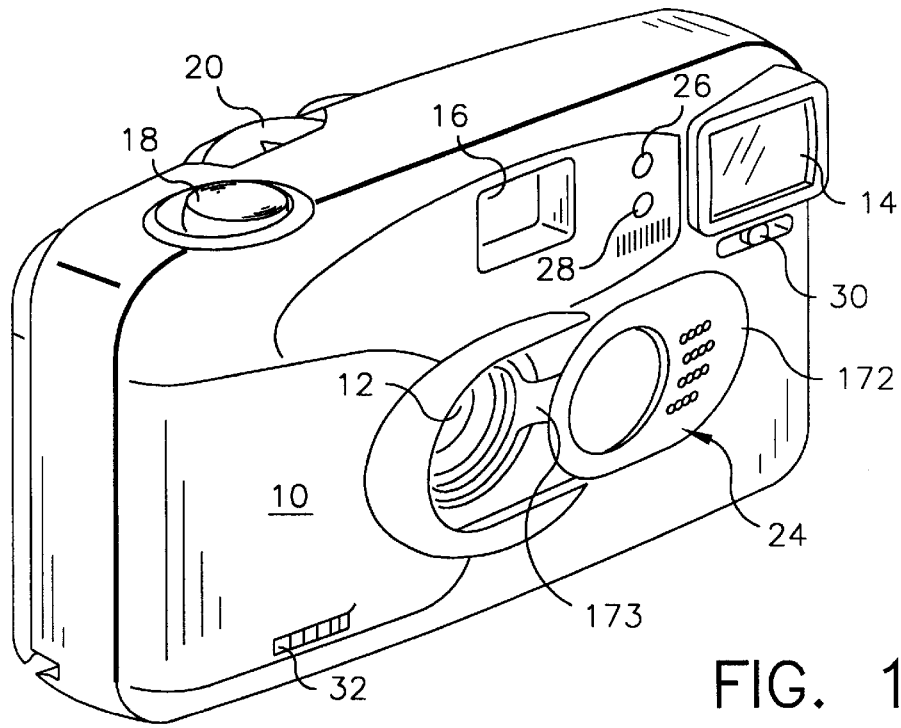
FIG. 1 is a front perspective view of a photographic camera in accordance with the invention.

FIG. 1 illustrates a photographic camera in accordance with the invention that includes a front housing cover 10, a lens 12, an electronic flash unit 14, an optical viewfinder 16, a shutter button assembly 18 and an exposure counter 20. A sliding lens cover assembly 24 is mounted to the front housing cover 10, such that movement of the sliding lens cover assembly 24 from a closed or secondary position to an open or primary position activates electronic control circuitry of the photographic camera as will be described in greater detail. A red-eye reduction lamp 26, an electronic flash sensor 28 and a fill-flash/flash-defeat control switch assembly 30 are preferably located adjacent to the electronic flash unit 14 as illustrated. A self-timer control button 32 is provided on the front of the camera to control the operation of a mechanical or electrical timer 300 mounted within the main body of the camera.

Figure 2:
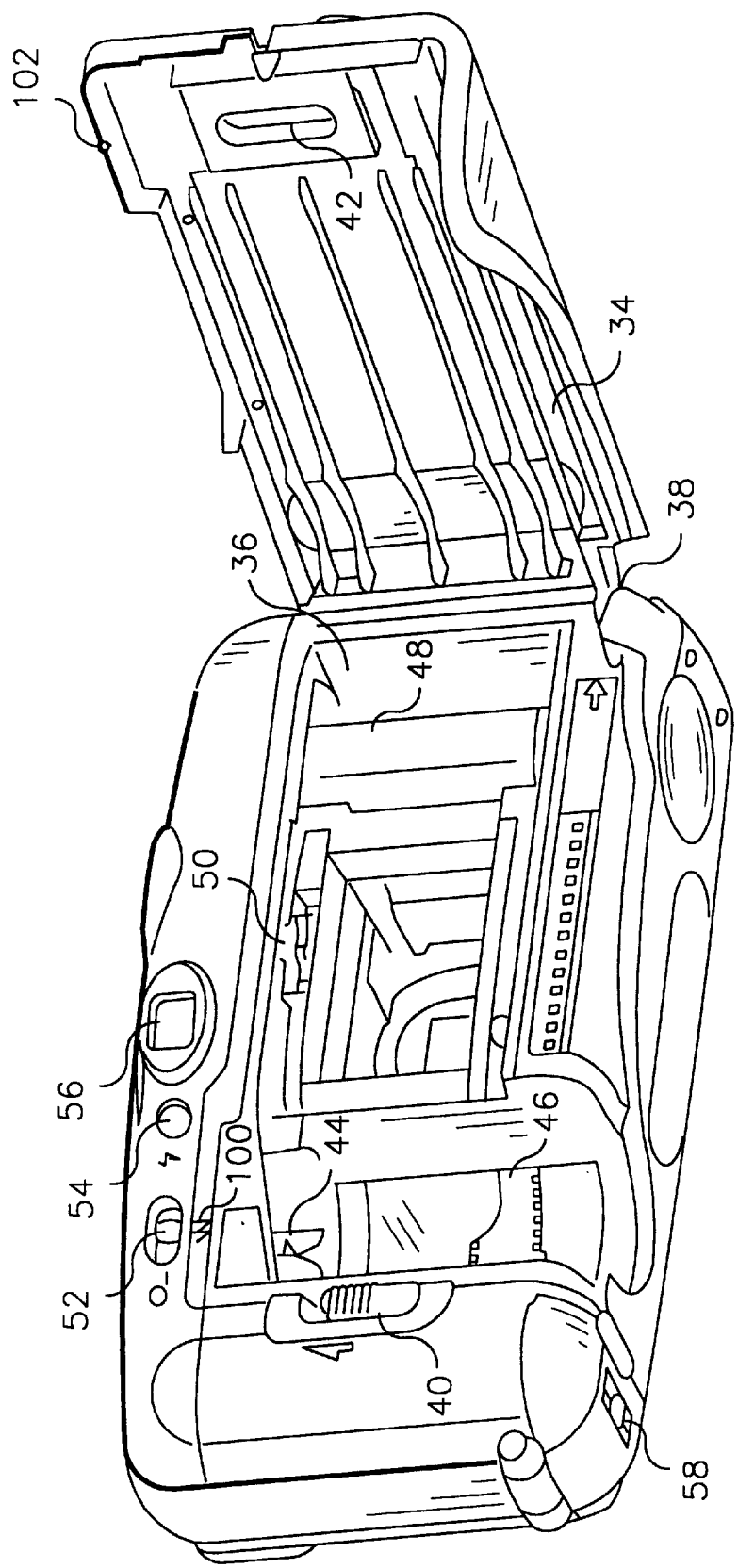
FIG. 2 is a rear perspective view of the photographic camera illustrated in FIG. 1.

FIG. 2 illustrates a back view of the camera shown in FIG. 1 with a film door 34 located in an open position. The film door 34 is coupled to a main camera frame 36 by a hinge assembly 38 and latched in a closed position by a latching mechanism 40 in a conventional manner. The film door 34 preferably includes a film window 42 that provides a camera operator with a view of the film chamber 46 of the camera in which a film spindle 44 is located. Film is advanced from a film canister loaded on the film spindle 44 in the film chamber 46 to a film take-up spool 48 by a motorized drive unit (not shown), and is maintained in proper position along a film transport path between the film chamber 46 and film take-up spool 48 by a film sprocket assembly 50. The film sprocket assembly 50 also serves to reset the camera's shutter mechanism and can act as a detent for a mechanical exposure counter 20. A film rewind control switch 52 is provided to cause the motorized drive unit to drive the film spindle 44 in a rewind direction when activated by the camera operator. Other illustrated features include a flash-ready indicator lamp 54 located adjacent to an optical viewfinder eyepiece 56 and a hinged battery compartment door 58.

Figure 3:
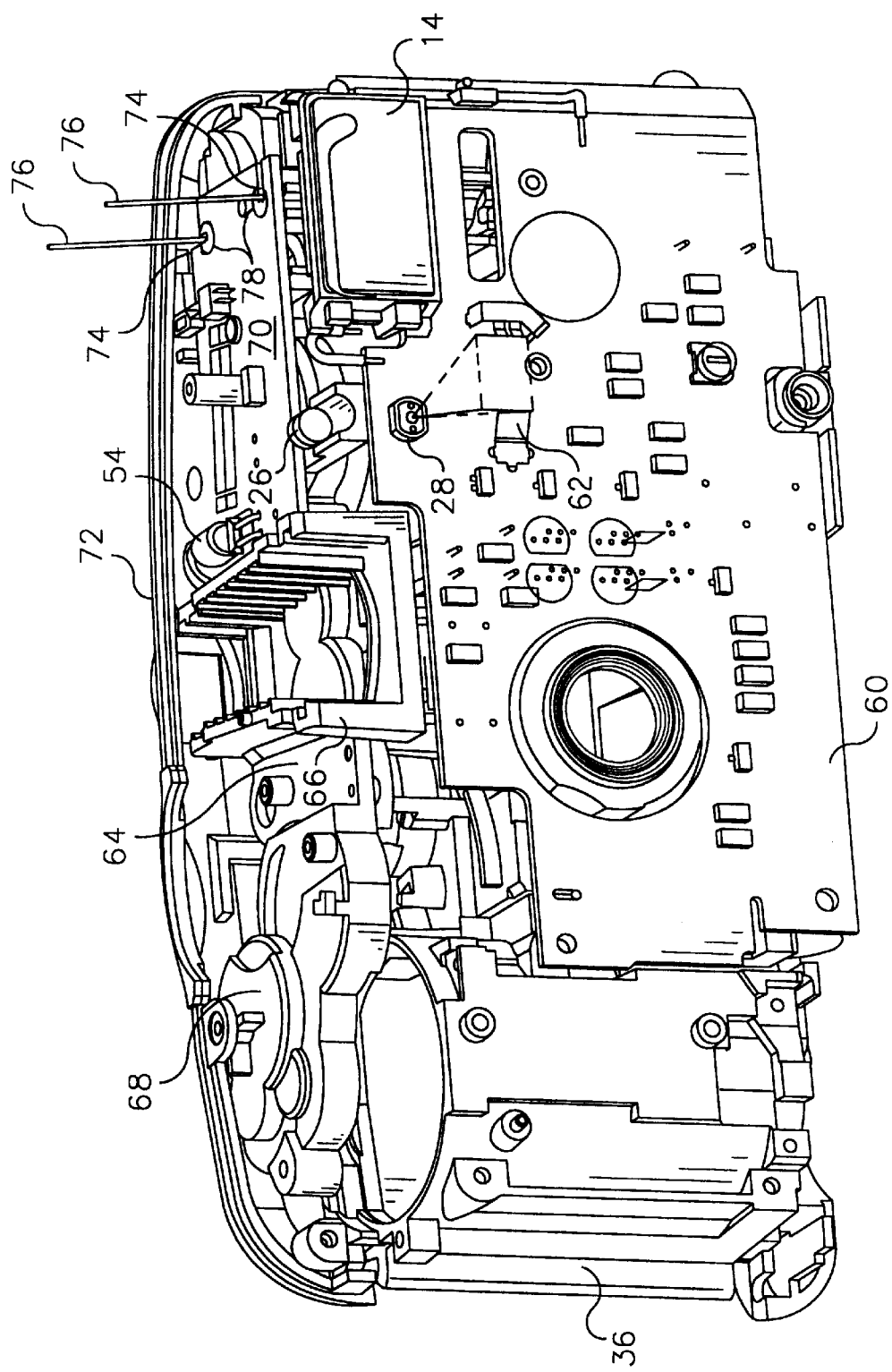
FIG. 3 is a front view of the camera illustrated in FIG. 1 with the front housing cover removed.

FIG. 3 illustrates a front view of the camera with the front housing cover 10 removed. A main printed circuit board 60 is attached to a front portion of the main camera frame 36. Various electronic control circuits for the camera, including a main camera control processor and flash control circuitry, are located on the main printed circuit board 60. In addition, discrete circuit elements, such as the electronic flash sensor 28 and an electronic flash operation control switch 62, are also located on the main printed circuit board 60. A mechanical plate 64 is attached to a top portion of the main camera frame 36 that includes a viewfinder retainer structure 66 and a motorized drive unit housing 68, respectively utilized to retain optical elements of the optical viewfinder 16 and a gear train of the motorized drive unit (not shown). An auxiliary printed circuit board 70 is also attached to the top portion of the main camera frame 36, such that a plane defined by the auxiliary printed circuit board 70 is substantially perpendicular to a plane defined by the main printed circuit board 60. The auxiliary printed circuit board 70 is preferably utilized to retain the red-eye reduction lamp 26 and the flash ready indicator lamp 54, as well as providing electrical coupling to battery leads 76. A rear housing cover 72 is also attached to a rear portion of the main camera frame 36.

In order to aid in the assembly of the overall camera structure, the auxiliary printed circuit board 70 includes slots 74 that are utilized to retain the battery leads 76. The battery leads 76 extend into a battery compartment of the camera located below the auxiliary printed circuit board 70 and behind the electronic flash unit 14. The slots 74 and battery leads 76 are preferably sized to provide a mechanical "snap" fit, such that the battery leads 76 are physically held in place by the slots 74. The use of a mechanical snap fit for the slots 74 and battery leads 76 greatly simplifies the manufacturing process, by allowing the battery leads 76 to be properly located and held in place until a soldering operation can be performed to connect the battery leads 76 to electrical leads 78 that are provided, either adjacent to or immediately surrounding the slots 74, on the auxiliary printed circuit board 70. Any excess in the length of the battery leads 76 is preferably trimmed once the soldering operation is completed. Although a mechanical snap fit is preferred to physically hold the battery leads 76 in place while awaiting a soldering operation, the battery leads 76 need only be retained within the slots 74 in a manner to permit the proper soldering of the battery leads 76 to the electrical leads 78.

Figure 4:
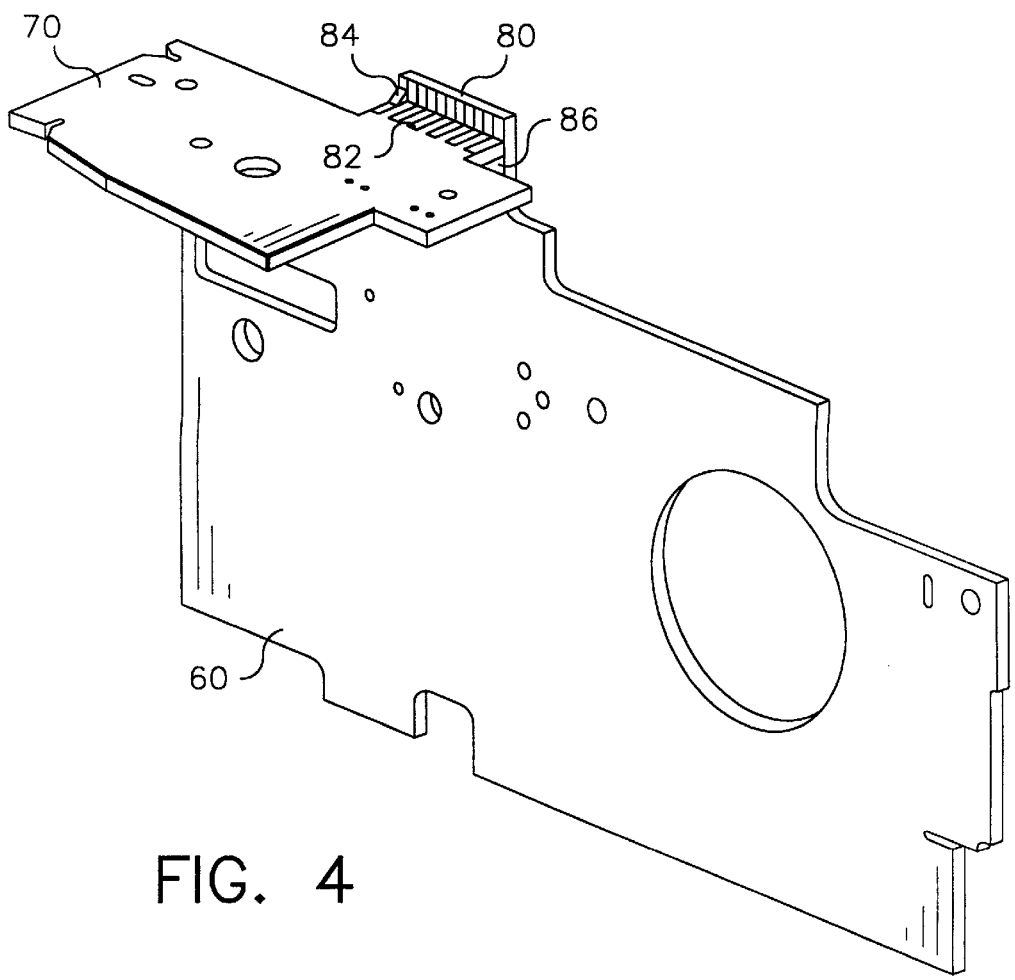
FIG. 4 illustrates the electrical coupling of a main printed circuit board and an auxiliary printed circuit board incorporated in the camera of FIG. 1 utilizing abutting electrical contacts.

The main printed circuit board 60 and the auxiliary secondary printed circuit board 70 are electrically coupled together to permit the transfer of electrical control and power signals between the two circuit boards. Conventional techniques such as flexible circuits, ribbon cables or discrete wires can be utilized to provide the required electrical coupling. In order to greatly simplify the manufacturing process, however, it would be preferred that electrical leads of the main printed circuit board 60 and the auxiliary printed circuit board 70 be directed coupled. FIG. 4 illustrates an embodiment of the invention in which the main printed circuit board 60 and the auxiliary printed circuit board 70 are located substantially perpendicular, such that electrical leads 80 on the main printed circuit board 60 perpendicularly abut electrical leads 82 on the auxiliary printed circuit board 70. A soldering operation is then performed to connect the electrical leads 80 to the electrical leads 82 with a solder connection joint 84 located at the junction of the perpendicular abutment. The use of the perpendicularly abutting electrical leads 80, 82 reduces the time required to solder the connections between the main printed circuit board 60 and the auxiliary printed circuit board 70 as compared with the time generally required to solder flexible circuits or discrete wires. It should be noted that the electrical leads 82 of the auxiliary printed circuit board 70 could also be located on a lower surface thereof, as viewed in the FIG. 4, such that the solder connection joint 84 would be located at a connection point 86 underneath the auxiliary printed circuit board 70. In such an embodiment, the portion of the main printed circuit board 60 containing the electrical leads 80 would not have to extend past the auxiliary printed circuit board 70 as shown in FIG. 4, but instead, would terminate at the upper surface of the auxiliary printed circuit board 70. Other variations, of course, are possible depending on the layout of the main and auxiliary printed circuit boards 60, 70 within the main body of the camera.

Figure 5:
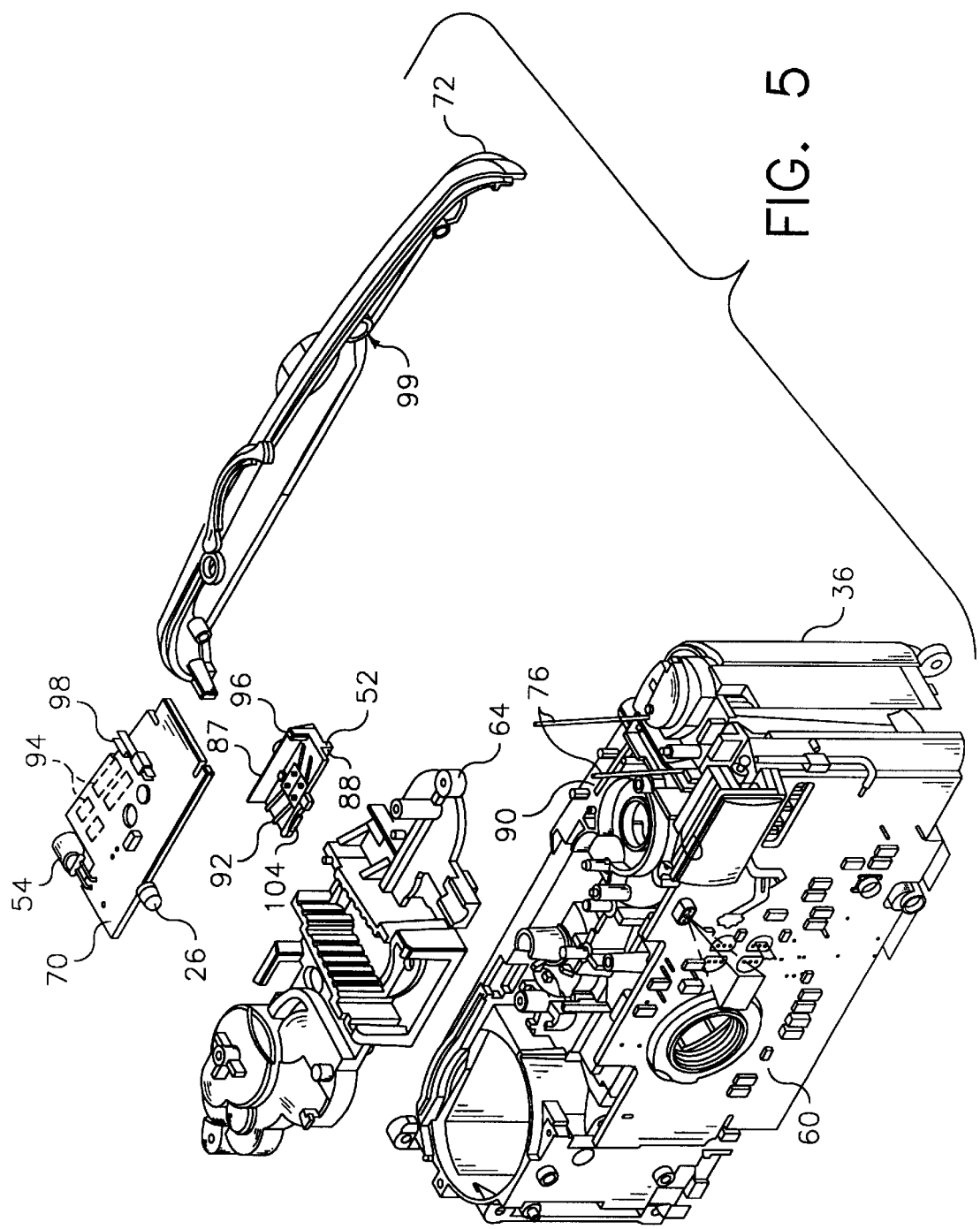
FIG. 5 is a partial exploded view of the camera illustrated in FIG. 1.

FIG. 5 illustrates a partial exploded view of the camera structure illustrated in FIG. 3. As can be seen in FIG. 5, the film rewind control switch 52 is located between the auxiliary printed circuit board 70 and the main camera frame 36, and includes a main switch body 87 having a flexible slide element 88 that fits into a slot 90 in the main camera frame 36. Electrical contact wiper elements 92 are provided on a top surface of the main switch body 87. The electrical contact wiper elements 92 come into contact with electrical contacts 94 (shown by dotted lines) located on the bottom side of the auxiliary printed circuit board 70, as the film rewind control switch 52 is moved back and forth between an initial position and a film rewind position. An extension member 96 is also provided as part of the main switch body 87. The extension member 96 contacts and activates a switch element 98 provided on the top surface of the secondary printed circuit board 70. In the illustrated embodiment, the switch element 98 constitutes a portion of a current drain protection circuit. Accordingly, in the illustrated embodiment, the film rewind control switch 52 interacts with circuit elements on both sides of the auxiliary printed circuit board 70 to provide a compact and efficient design. The positioning of the auxiliary printed circuit board 70 with respect to the film rewind control switch 52 permits the flash-ready indicator lamp 54 to be readily aligned with an indicator lamp hole 99 located on the rear cover housing 72 of the camera.

Figure 6:
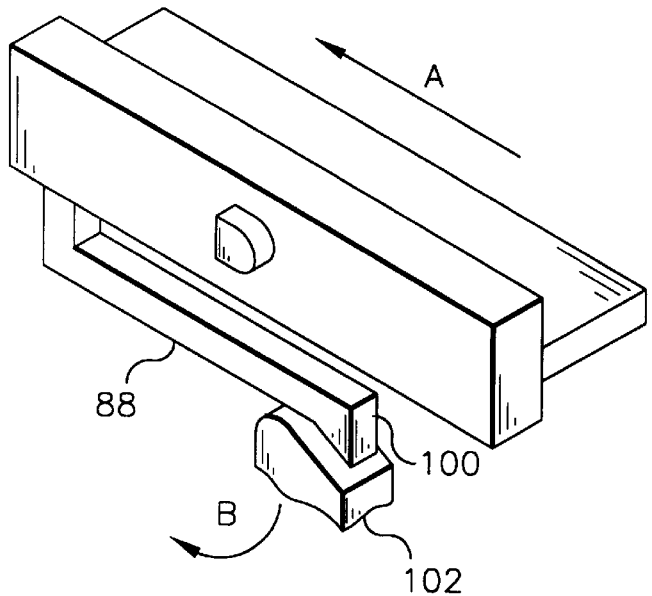
FIG. 6 is a perspective view of a film rewind control switch utilized in the camera illustrated in FIG. 1.
Figure 10:
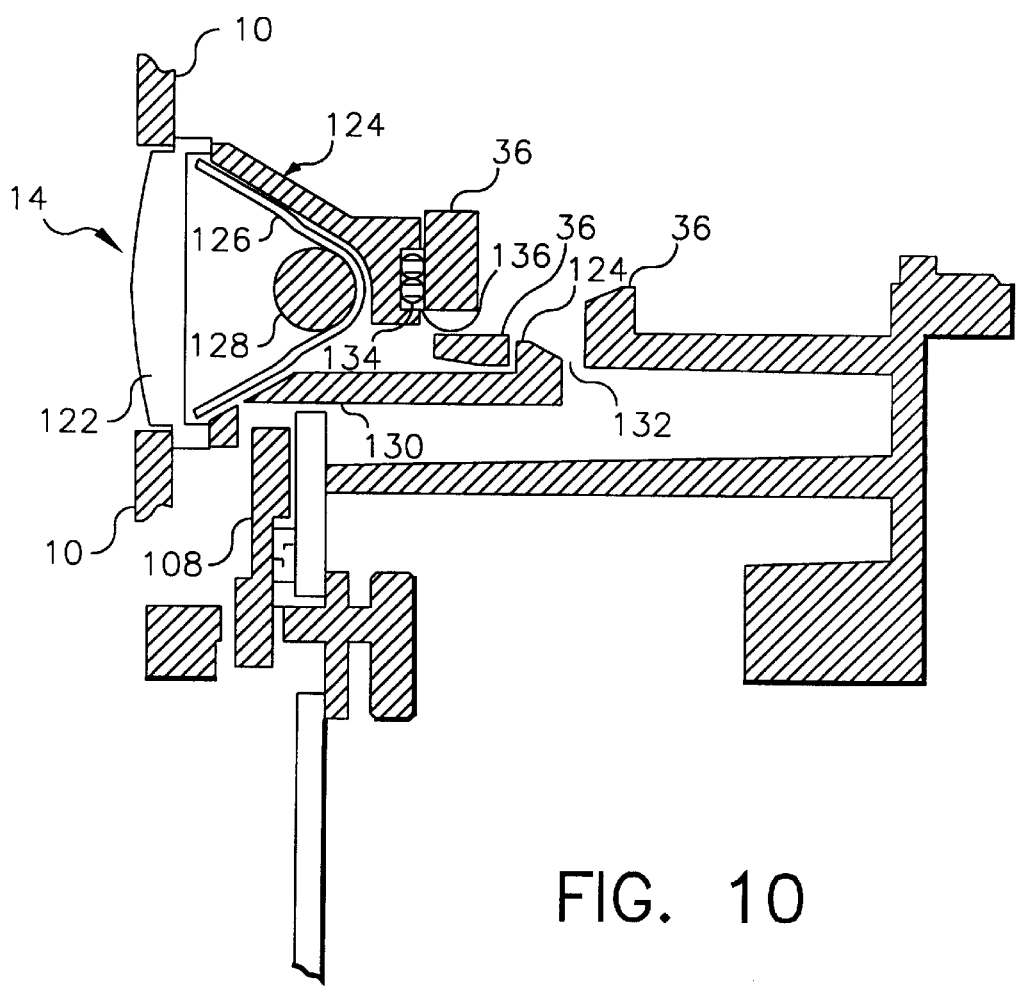
FIG. 10 is a side view illustrating the attachment of a wiper carrier assembly and an electronic flash unit.

An interface is provided between the film rewind control switch 52 and the film door 34 to reset the film rewind control switch 52 to the initial position when the film door 34 is opened to remove rewound film. Specifically, as shown in FIG. 6, the flexible slide element 88 includes a ramped end 100 that rides over and snaps in place behind a stop mechanism 102 provided on the film door 34, when the film door 34 is closed and the film rewind control switch 52 is moved to the film rewind position in the direction indicated by the arrow "A". When the film door 34 is opened, the stop mechanism 102 is pulled out of the path of the flexible slide element 88 along the path indicated by arrow "B", and the film rewind control switch 52 is pulled back to its initial position by a biasing spring 104 shown in FIG. 5. The relative positioning of the ramped end 100 of the flexible slide element 88 and the stop mechanism 102 when the film door is opened is shown in FIG. 1.

Figure 7:
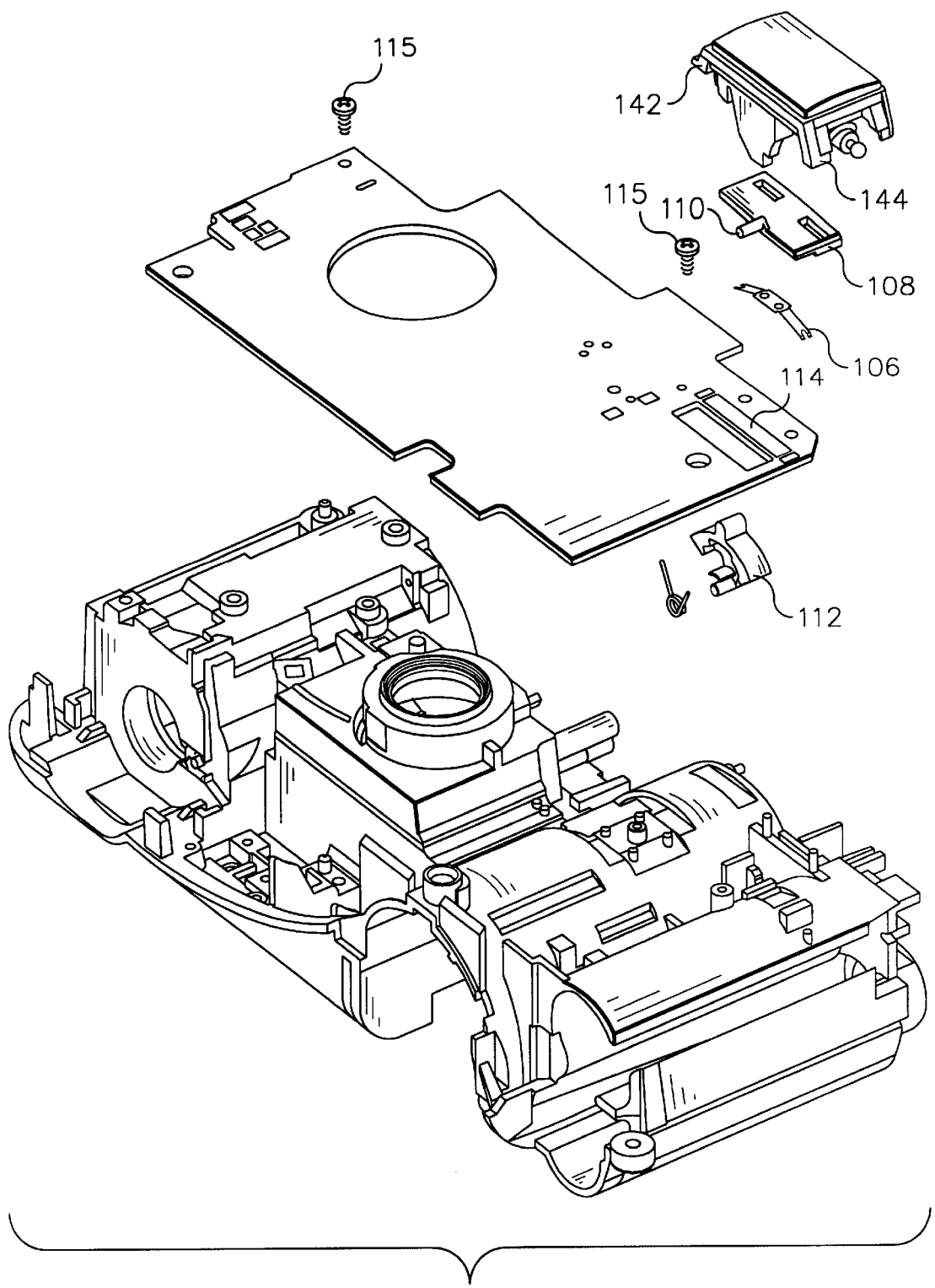
FIG. 7 is a partial exploded view of the attachment of an electronic flash unit to a main camera frame illustrated in FIG. 3.
Figure 8:
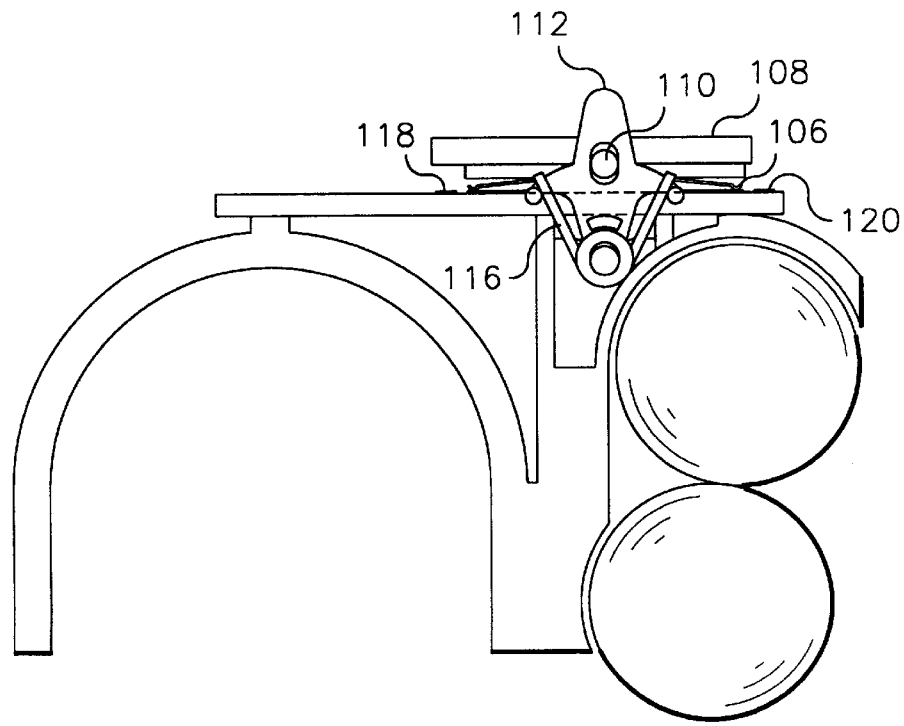
FIGS. 8 and 9 are bottom views illustrating the operation of a fill-flash/flash-defeat switch element utilized in the camera illustrated in FIG. 1.
Figure 9:
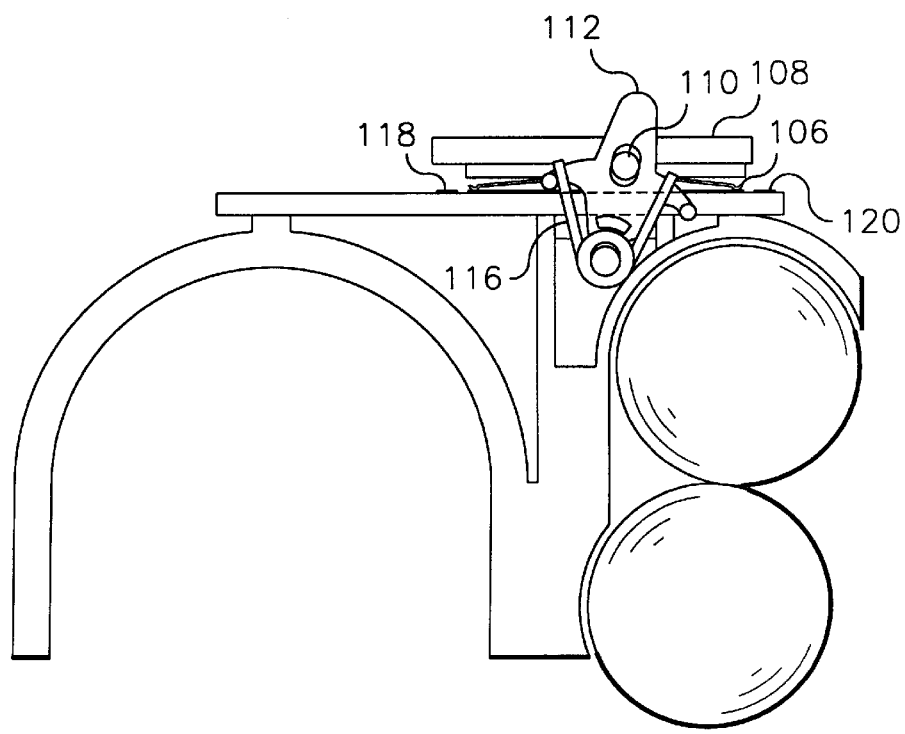

FIG. 7 illustrates a partial exploded view of the camera structure illustrated in FIG. 3 detailing the assembly of the electronic flash unit 14 and the fill-flash/flash-defeat control switch assembly 30 with respect to the main camera frame 36 and the main printed circuit board 60. The main printed circuit board 60 includes an electrical contact group 114 located on a front surface thereof that is utilized to provide signals corresponding to the operation of the fill-flash/flash-defeat control functions of the camera. An electrical contact wiper element 106 is coupled to a wiper carrier assembly 108, which includes a post element 110 that is captured in a slot provided in the fill-flash/flash-off switch element 112. As shown in FIG. 8, the fill-flash/flash-off switch element 112 is pivotally mounted to the main camera frame 36 and is biased to a neutral position by a spring element 116 as shown. Movement of the fill-flash/flash-defeat switch element 112 imparts a force to the post 110 of the wiper carrier assembly 108 causing the wiper carrier assembly 108, including the electrical contact wiper element 106 coupled thereto, to move laterally back and forth to selectively bring the electrical contact wiper element 106 into contact with either the left electrical contact 118 (to supply a fill flash condition signal to a control circuit of the camera) or the right electrical contact 120 of the electrical contact group 114 as illustrated in FIG. 9 (to supply a flash defeat condition signal to the control circuit of the camera).

Figure 11:
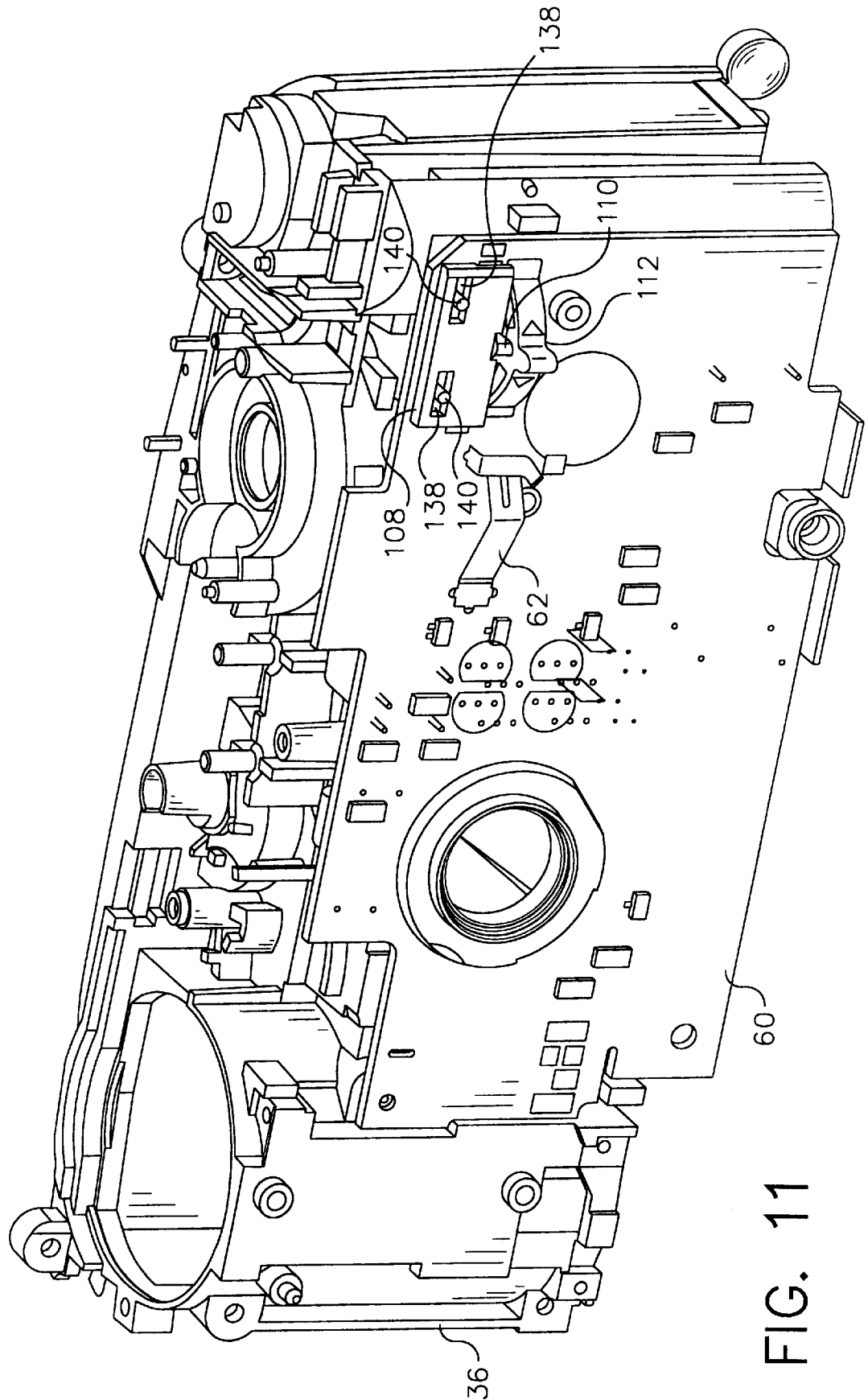
FIG. 11 is a perspective front view of the camera illustrated in FIG. 3 with the wiper carrier assembly shown in place.

The top portion of the wiper carrier assembly 108 is held in place against the main printed circuit board 60 primarily by the electronic flash unit 14. As shown in the FIG. 10, the electronic flash unit 14 includes a transparent cover 122 that snaps onto a reflector mounting structure 124. A reflector plate 126 and a flash tube 128 are retained within the reflector mounting structure 124. The reflector mounting structure 124 includes a flexible extension arm 130 that snaps into a relief opening 132 provided in the main camera frame 36. The entire flash unit 14 is resiliently biased outward into position against the front camera housing 10 by an elastic band 134 that is looped around the ends of the flash tube 128 (indicated by dashed line) and passes between the reflector mounting structure 124 and the main camera frame 36 in a channel 136. As shown in FIG. 11, which provides a view with the electronic flash unit 14 removed, guide openings 138 are provided to permit the wiper carrier assembly 108 to slide back and forth over guide ribs 140 that extend from the main camera frame 36. The sequence of assembly includes mounting the fill-flash/flash-defeat switch element 112 to the main camera frame 36, mounting the main circuit board 60 onto the main camera frame 36 with mounting screws 115 to locate and retain the fill-flash/flash-defeat switch element 112 in place, positioning the wiper carrier assembly 108 so that the post 110 is captured by the fill-flash/flash-defeat switch element 112 and locating the guide ribs 140 within the guide openings 138, and snapping the reflector mounting structure 124 into the main camera frame 36. The overall structure is simple to assemble without requiring mechanical fasteners other than the screws 115 used to attach the main circuit board 60 to the main camera frame 36.

Figure 12:
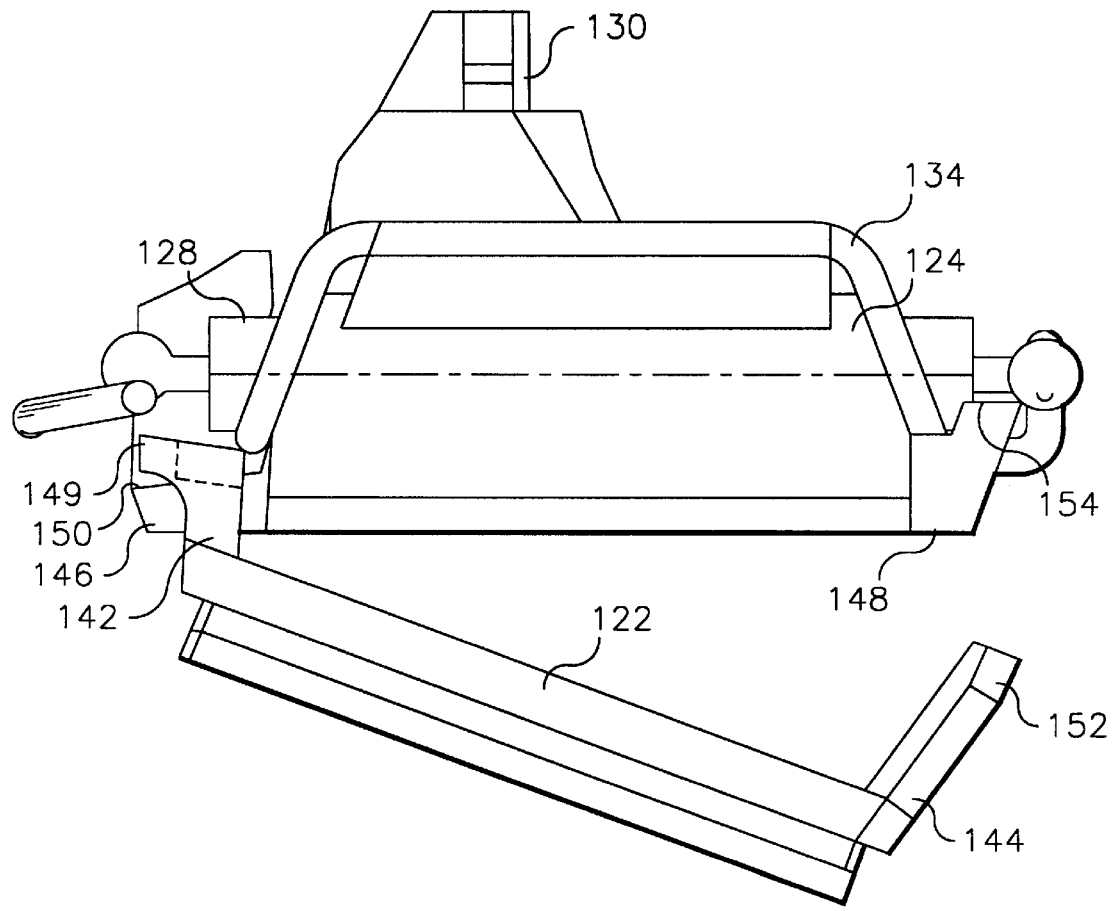
FIG. 12 is a top view illustrating the attachment of a transparent cover to a reflector body structure of the flash unit illustrated in FIG. 10.

The transparent cover 122 is also provided with a mechanism to permit easy attachment of the reflector mounting structure 124. As shown in FIG. 12, a first side of a top edge of the transparent cover 122 is provided with an "L" shaped leg 142 and a second side of the top edge of the transparent cover 122 is provided with a substantially straight leg 144 that is longer than the L-shaped leg 142. An identical L-shaped leg 142 and an identical straight leg 144 are also provided at a bottom edge of the transparent cover 122 as shown in FIG. 7. The reflector mounting structure 124 is provided with a straight extension portion 146 and an angled extension portion 148 that respectively correspond to the L-shaped leg 142 and the straight leg 144 of the transparent cover 122. During assembly, the transparent cover 122 is engaged with a first side of the reflector mounting structure 124 such that the L-shaped leg 142 extends over the straight extension portion 146 as shown in FIG. 12. A hook protrusion 149 extending downward from the tip of the L-shaped leg 142 (or upward in the case of the lower leg illustrated in FIG. 7) is placed behind a back surface 150 of the straight extension portion 146. Accordingly, the L-shaped leg 142 pivots on the straight extension portion 146 in a hinged manner, thereby allowing the straight leg 144 to be rotated toward the angled extension portion 148 of the reflector mounting structure 124. A hook protrusion 152 extending downward from the straight leg 144 latches over a back edge 154 of the angled extension portion 148 to secure the transparent cover 122 to the reflector mounting structure 124 with a snap fit that prevents contaminants from entering the electronic flash unit 14.

Figure 14:
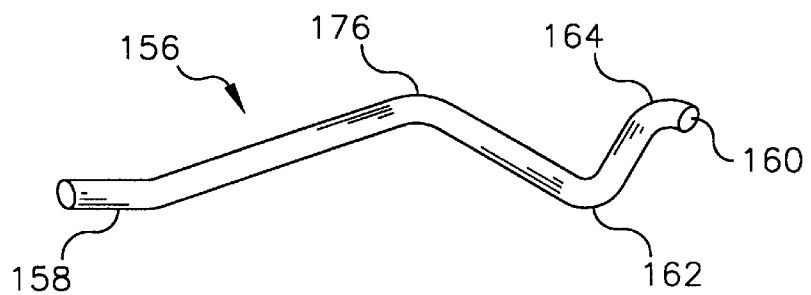
FIG. 14 illustrates the structure of a leaf spring switch element.
Figure 13:
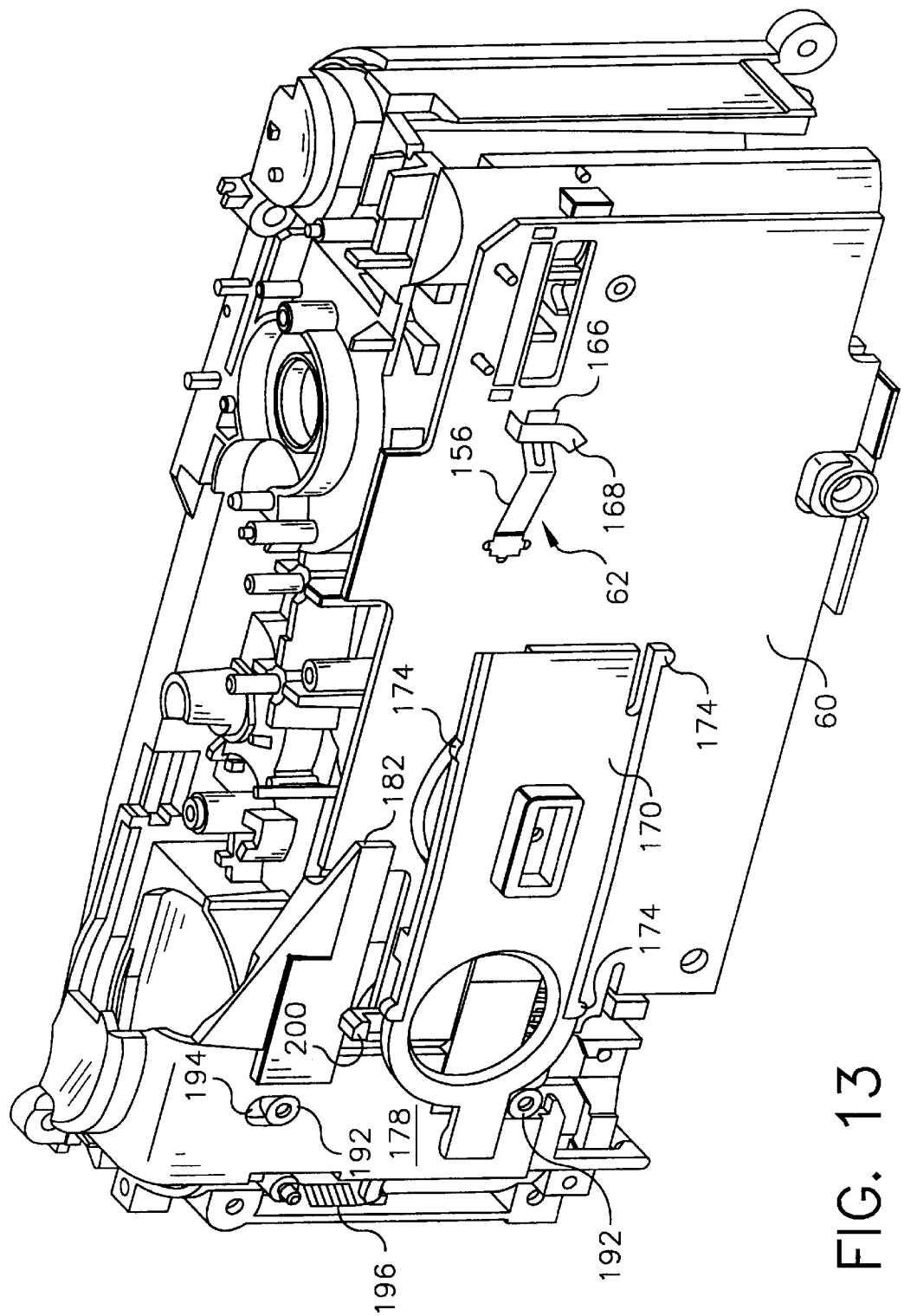
FIG. 13 is a front perspective view of the camera illustrated in FIG. 3 with an internal slide member of a sliding lens cover assembly located in a closed position.

The specifics of the flash operation control switch 62 will now be described with reference to FIGS. 13–15, 21 and 22. The flash operation control switch 62 includes a leaf spring switch element 156 that is attached the main circuit board 60 at a first end 158 and has a second end 160 that is shaped to form first and second opposing contact points 162, 164 as shown in FIG. 14. The second end 160 of the leaf spring switch element 156, including the first and second opposing contact points 162, 164, is located between an electrical contact pad 166 provided on the main printed circuit board 60 and a "bridge" contact 168 that is coupled to the main printed circuit board 60 at both ends, so that the bridge contact 168 extends up and over the second end 160 of the leaf spring switch element 156 as shown in FIG. 13. The leaf spring switch element 156 is biased upward so that a second opposing contact point 164 comes into electrical contact with the bridge contact 168 when the sliding lens cover 24 is in the closed position. In a preferred embodiment illustrated in FIG. 21, the leaf spring switch element 156 is configured to act as a double-throw-single-pole switch to disable a flash charger circuit for the electronic flash unit 14 and to turn off the flash ready indicator lamp 54. The flash charger circuit and the flash ready indicator lamp 54 are turned on when the leaf spring switch element 156 is pushed downward so that the first opposing contact point 162 makes contact with the contact pad 166.

Figure 15:
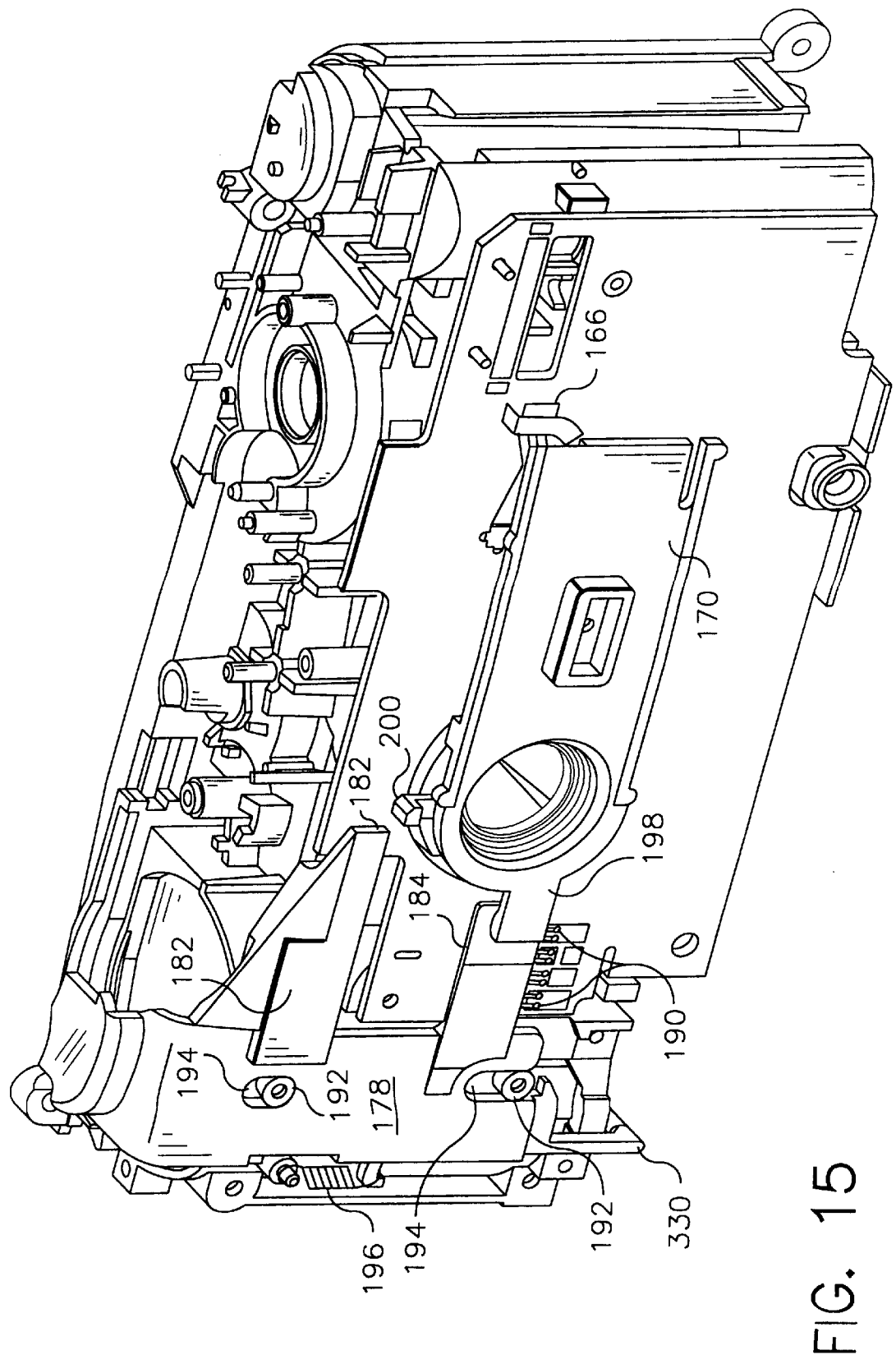
FIG. 15 is a front perspective view of the camera illustrated in FIG. 3 with an internal slide member of a sliding lens cover assembly located in an open position.

The leaf spring switch element 156 is controlled by the sliding lens cover assembly 24. Specifically, the sliding lens cover assembly 24 includes an interior slide plate 170 that is coupled to an exterior slide plate 172 by a screw that slides within a slot 173 provided in the front housing cover 10 (See FIG. 1). The interior slide plate 170 includes guide protrusions 174 that ride on ridges provided on the inside of the front housing cover 10. When the sliding lens cover assembly 24 is moved from the closed position shown in FIG. 13 to an open position as shown in FIG. 15, the slide plate 170 comes into contact with an upwardly extending contact point 176 of the leaf spring switch element 156, and pushes downward on the contact point 176 shown in FIG. 14 to move the first opposing contact point 162 into contact with the electrical contact pad 166 provided on the main printed circuit board 60 with a force of approximately five ounces.

The simple design of the leaf spring switch element 156 can easily handle currents in excess of two amps. The illustrated embodiment, for example, utilizes a leaf spring switch element 156 manufactured from beryllium copper having a width of 3.5 mm, a thickness of 0.13 mm and a length of approximately 15 mm that switches between five and six amps of current. Greater current capacities are also possible depending on type and dimensions of the material utilized. In desired, the second end 160 of the leaf spring switch element 156 is also slit to provide multiple contact points, with each contact point being capable of handling the full current capacity of the leaf spring switch element 156, thereby if one contact point becomes damaged or dirty.

Figure 22:
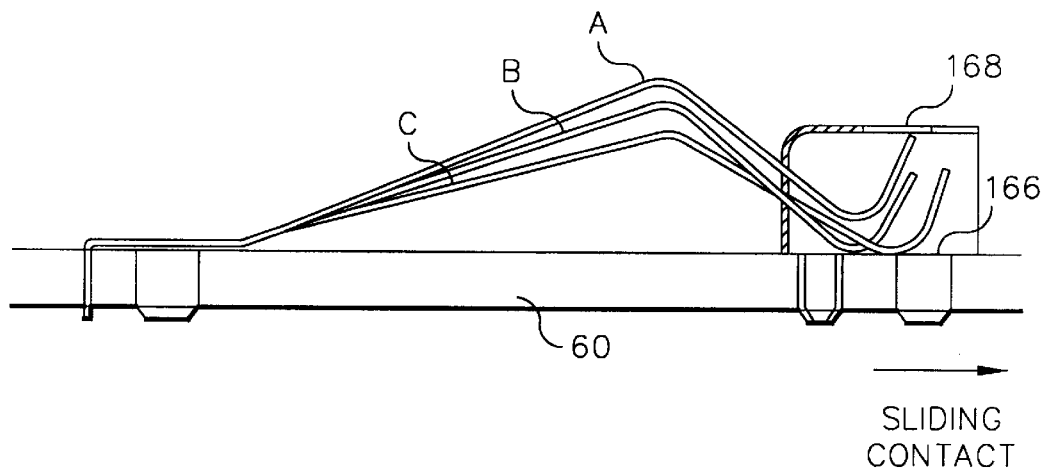
FIG. 22 is a side view of the flash operation control switch in different operating positions.

Another advantage to the leaf spring switch element 156 is the ability to clean contact surfaces during operation by providing a sliding contact motion. FIG. 22 illustrates multiple positions of the leaf spring switch element 156 during operation. In position A, the sliding lens cover assembly 24 is in the closed position such that the first opposing contact point 164 of the leaf spring switch element 156 is in contact with the bridge contact 168. As the sliding lens cover assembly 24 is moved to the opened position, contact is made with the contacting point 176 and a downward force is applied to the leaf spring switch element 156 until the first opposing contact 162 comes into contact with the electrical contact pad 166 at an intermediate position B. The sliding lens cover assembly 24 continues to apply a force that causes the first opposing contact 162 to slide of the surface of the electrical contact pad 166, thereby causing a frictional contact that cleans the surfaces of the first opposing contact 162 and the electrical contact pad 166, until a final contact position C is reached.

Figure 16:
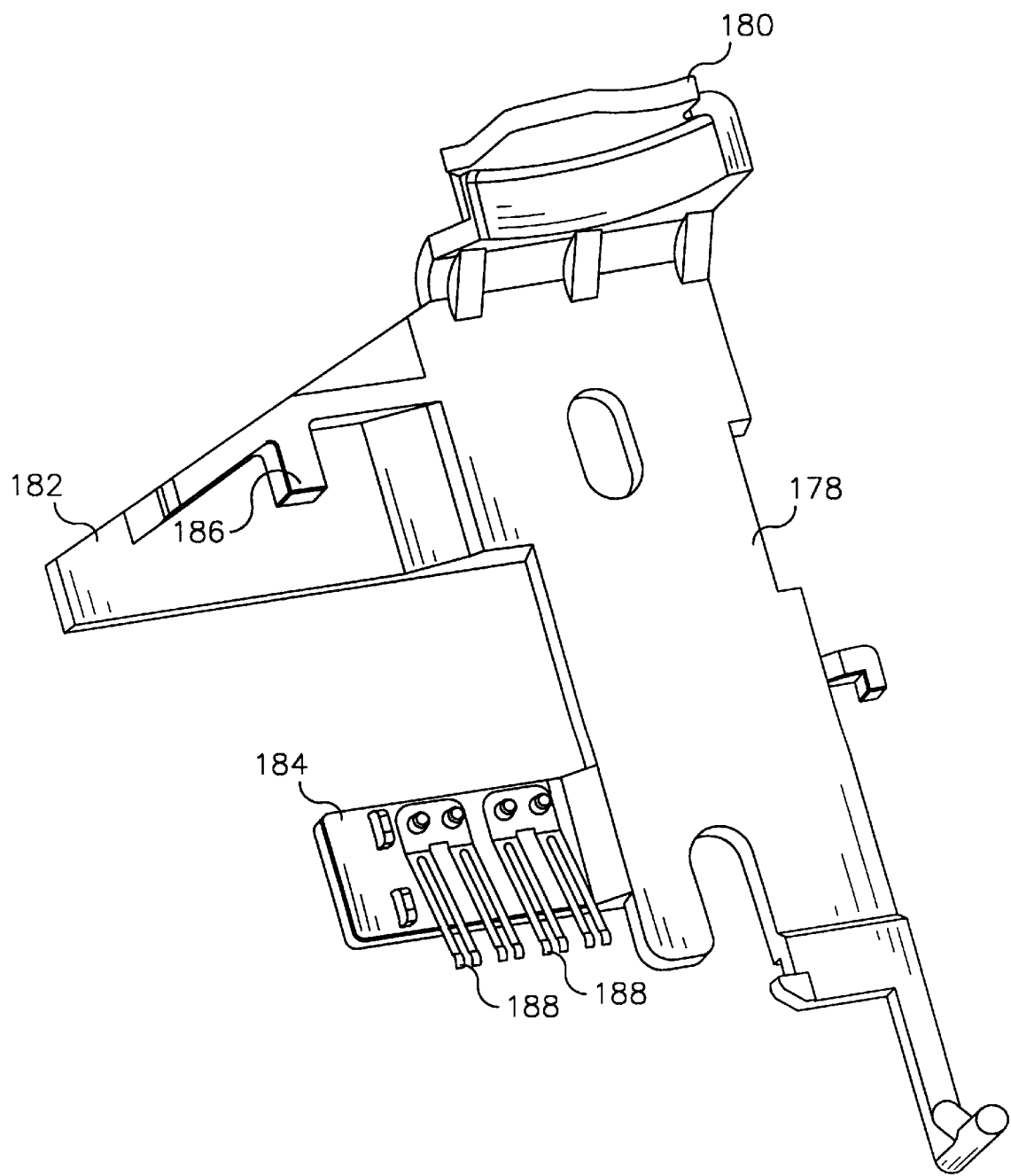
FIG. 16 illustrates a shutter button assembly.

The operation of the shutter button assembly 18 will now be described with reference to FIGS. 13, 15 and 16. As shown in FIG. 16, the shutter button assembly 18 includes a vertical sliding member 178 including a shutter button arm 180, a shutter actuation arm 182 and an electrical contact arm 184. (A timer release arm 330 is discussed below.) The shutter actuation arm 182 includes a shutter actuation member 186 that contacts a shutter release 302 (either a mechanical member, such as a high energy lever, or an electrical switch) located on the main camera frame 36, when the sliding member 178 is pushed downward by the application of a force to the shutter button arm 180 by a camera operator. As the sliding member 178 moves downward, and before the shutter actuation member 182 contacts the shutter release 302, electrical contact wiper elements 188 provided on the electrical contact arm 184 are moved downward into contact with electrical contact pads 190 provided on the main printed circuit board 60 as shown in FIG. 15. The electrical contact pads 190 are arranged to cause a sequence of signals to be provided to the electrical control circuits of the camera so that various pre-exposure operations can be performed prior to activation of the shutter release 302 by the shutter actuation member 182. Relative positions of wiper elements 188 and pads 190 can also be varied in other ways to complete electrical circuits during operation of the shutter button assembly, as desired.

As shown in FIGS. 13 and 15, the sliding member 178 is movably mounted to the main camera frame 36 and slides back and forth over protrusions 192 that fit into slots 194 provided in the sliding member 178. The protrusions 192 are internally threaded to permit the insertion of a retainer screw (not shown) to prevent the sliding member 178 from slipping off. A biasing member or spring 196 is provided to bias the sliding member 178 in an upward direction. The interior slide plate 170 of the sliding lens cover assembly 24 includes a retainer 198 that slides over the electrical contact arm 184 of the sliding member 178. The retainer 198 controls the amount of contact pressure applied to the electrical contact wiper elements 188 provided on the electrical contact arm 184. The interior slide plate 170 also includes a shutter lock member 200 that interacts with the shutter actuation arm 182. Specifically, when the sliding lens cover assembly 24 is in the closed position, the shutter lock member 200 is located under the shutter actuation arm 182, thereby preventing the downward movement of the vertical sliding member 178 as shown in FIG. 13. Accordingly, the sliding lens cover assembly 24 interacts with the other camera components in the illustrated embodiment to provide a shutter lock, activation of the flash control circuitry, and to control the contact pressure applied to the electrical contact wiper elements 188.

Figure 17:
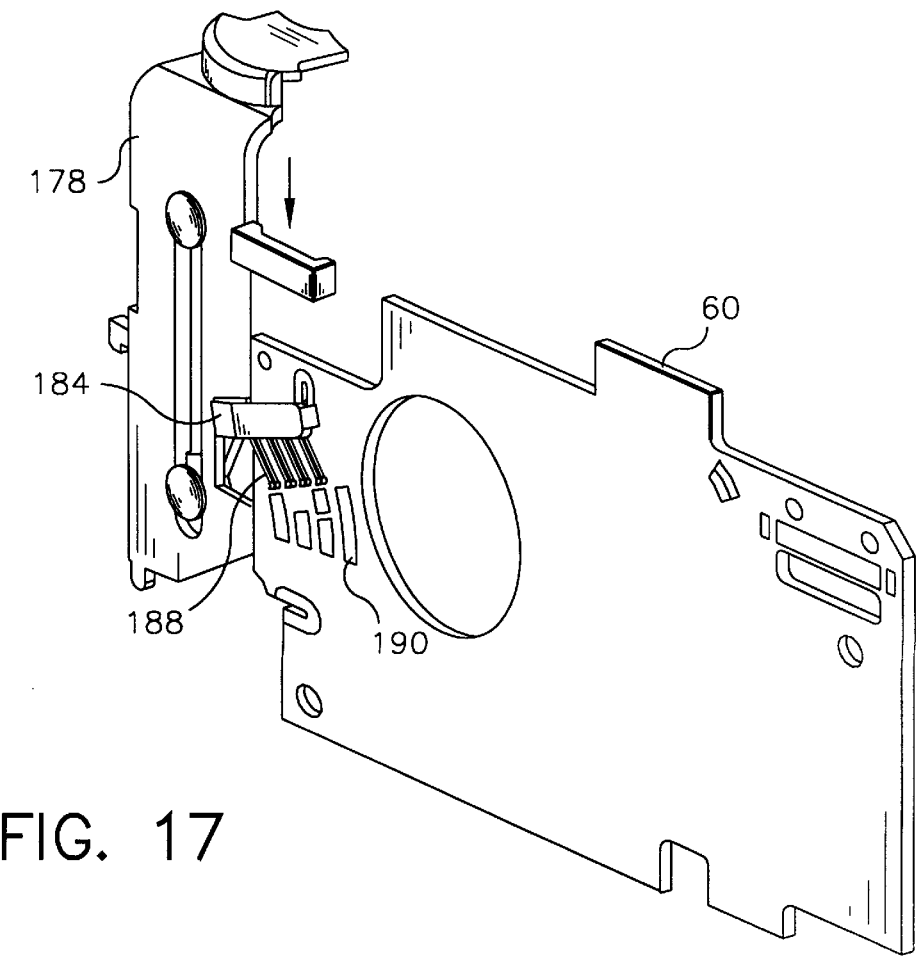
FIG. 17 is a front perspective view of a second embodiment of the invention that utilizes a pivot yoke to permit pivotal movement of an electrical contact arm of a shutter button assembly.
Figure 18:
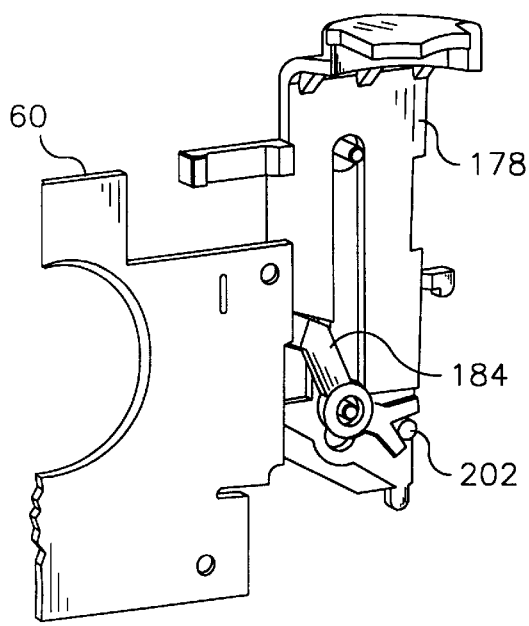
FIG. 18 is a rear perspective view of the embodiment shown in FIG. 17.
Figure 19:
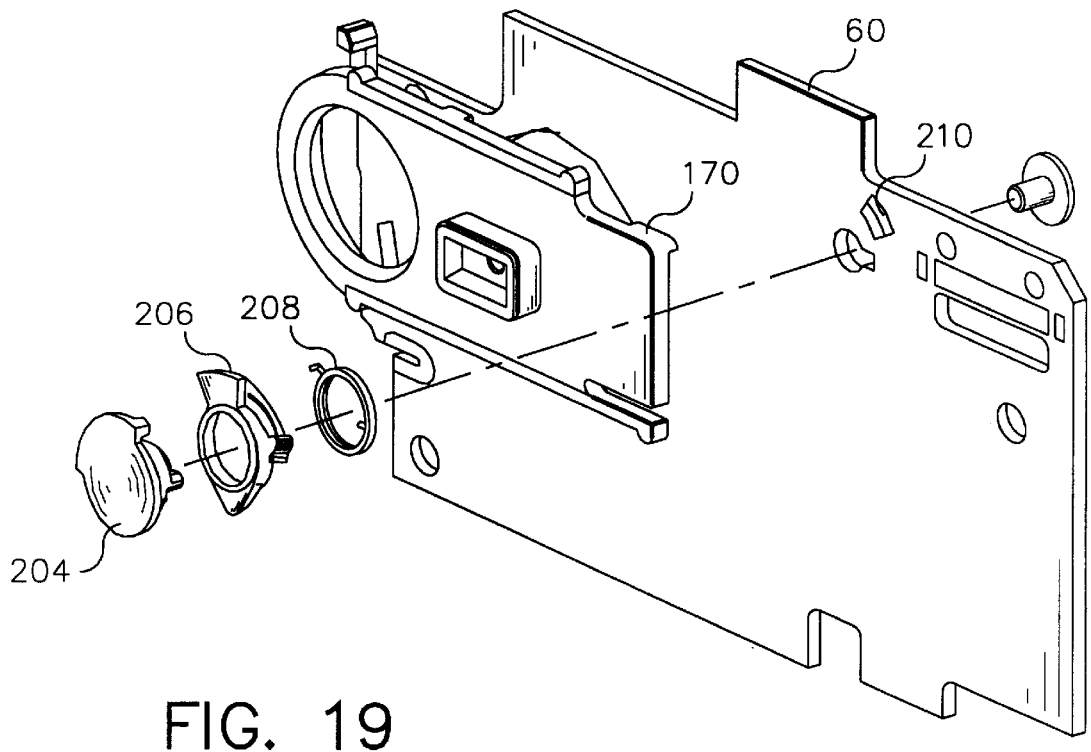
FIG. 19 is an exploded view of a third embodiment of the invention that incorporates a rotary switch.
Figure 20:
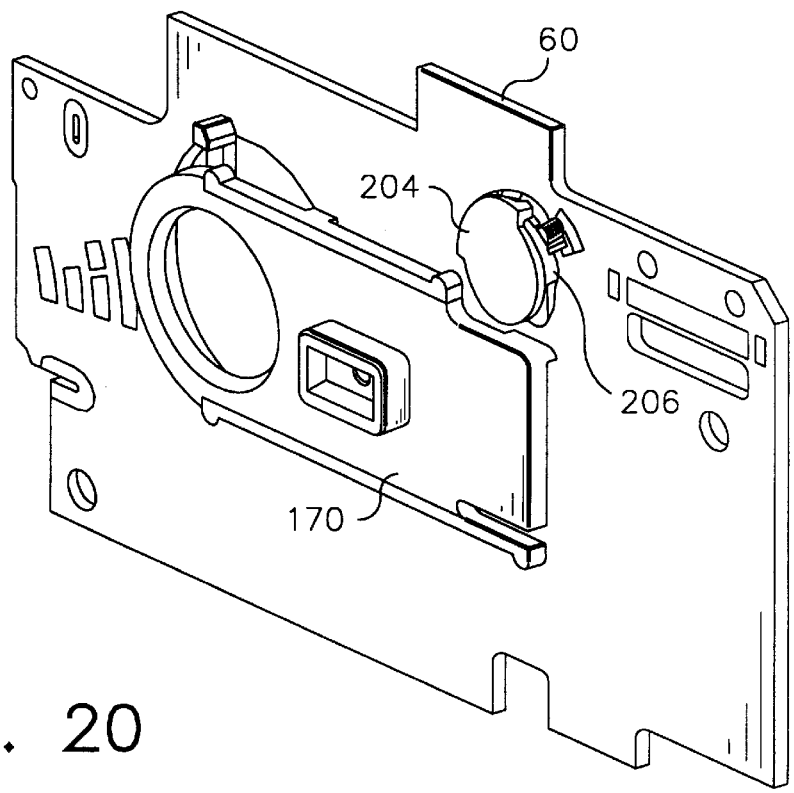
FIG. 20 is a perspective view of the embodiment illustrated in FIG. 19 with an internal slide member of a sliding lens cover making contact with the rotary switch.
Figure 21:
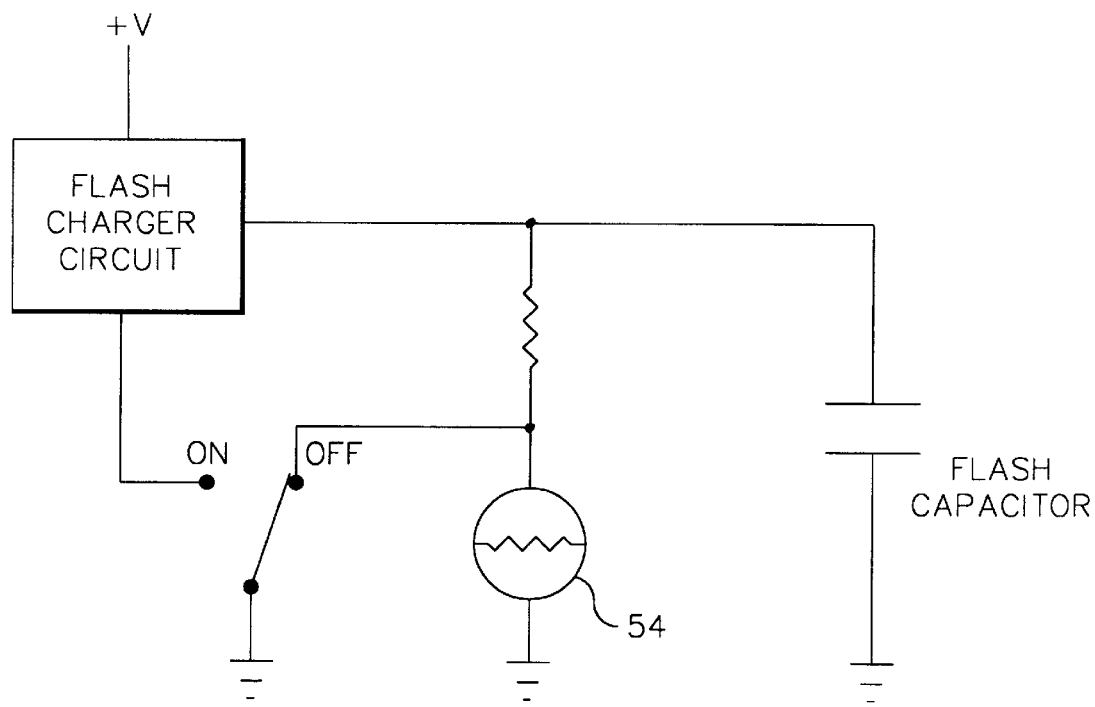
FIG. 21 is a circuit diagram illustrating the interconnection of a flash charger circuit and flash-ready indicator lamp with a flash operation control switch.

The camera is described above with reference to a particular shutter button assembly 18. It will be understood, however, that modifications and variations are possible within the scope of the invention. FIGS. 17 and 18, for example, illustrates a further embodiment of the invention in which the electrical contact arm 184 is attached to the vertical sliding member 178 of the shutter button assembly 18 via a pivot yoke 202. The pivot yoke 202 allows the electrical contact arm 184 to move in an arc, thereby allowing the electrical contact wiper elements 188 to sweep over arched or curved contact pads provided on the main printed circuit board 60. A still further embodiment of the invention is illustrated in FIGS. 19 and 20 in which the flash control switch 62 take the form of a rotary switch including a fixed switch mount 204 that is coupled to the circuit board 60 and a rotating wiper assembly 206 that is spring loaded by a spring 208 and rotates to make contact with contact pads 210 provided on the circuit board 60 when contacted by the interior sliding member 170 as shown in FIG. 20.

Referring now to FIGS. 21–30, the camera has a timer 300 that interacts with the shutter release 302 to allow film exposure after a predetermined delay. The timer 300 and related camera features are described below in terms of one particular embodiment. It will be understood, however, that features can be varied in a manner consistent with the claims.

The timer 300 includes a delay counter 304 and a linkage 306 coupled to the delay counter 304 for movement, in synchronism with the delay counter 304, from a start configuration to an exposure configuration and from the exposure configuration to an end configuration.

The timer 300 shown in FIGS. 23–32 is mechanical and has a frame 308 that is fixedly mounted in the camera body by some means, such as fasteners, heat fusion, or adhesive. The frame 308 can be made in two or more pieces held together by fasteners 301 or the like. The frame 308 supports the delay counter 304: a spring 310, a winder 312, a gear train 314, and an escapement 316; and the linkage 306. The gear train 314 is mounted in the frame 308. The spring 310 is mounted in the frame 308 and bears on a projection 320 of an input gear unit 318 of the gear train 314, mechanically loading the input gear unit 318 and urging its rotation. The term "gear unit" is used herein to refer to an assembly of two or more gears fixed for rotation about a common axis. Connecting gear units 322, 324,356 are arranged in mechanical sequence between the input gear unit 318 and an output gear unit 328. The output gear unit 328 drives an escapement 316. Details of gear trains 314 and escapements 316 suitable for this purpose, are well known to those of skill in the art. The winder 312 is mechanically connected to the spring 310 and is movable from an unwound position to a wound position to load the spring 310.

The timer 300 works with the sliding member 178 and the shutter release 302. As previously discussed, the sliding member 178 includes the shutter button arm 180, the shutter actuation arm 182, and the timer release arm 330. The sliding member 178 is moveable from a first position, shown in FIG. 24, to a second position, shown in FIG. 23, by application of a force to the shutter button arm 180. A biasing member biases the sliding member 178 for return from the second position to the first position. The directions of movement of the sliding member 178, between the first and second positions, are indicated by a double headed arrow 332. The sliding member 178 can include an electrical contact arm 184, as shown in FIGS. 25–29. The electrical contact arm 184 has a plurality of electrical contact elements 188 that sweep past contact pads 190 when the sliding member 178 is moved. The electrical contact elements 188 are disposed so as to individually engage respective contact pads 190 when the sliding member 178 is in one of the first position, the second position, and a plurality of positions intermediate between the first and second positions.

Figure 24:
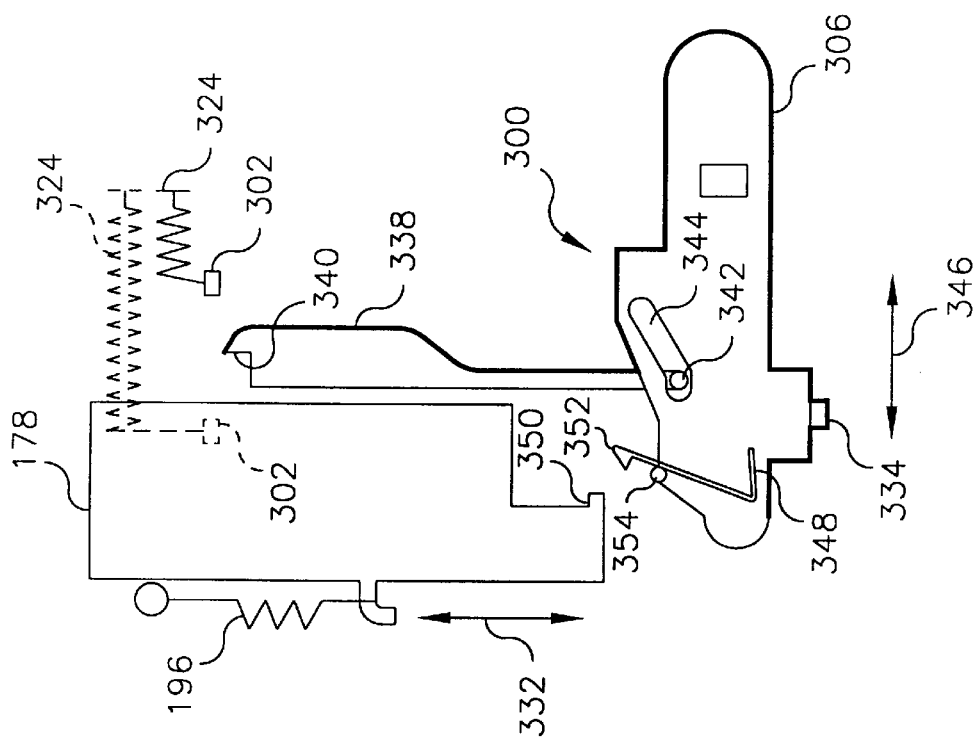
FIG. 24 is the same view as in FIG. 23, but shows the sliding member in the first position, the linkage in the end configuration, and the shutter release in the released position in solid lines. The location of the contact surface of the shutter release when the shutter release in the initial position is indicated by a dashed line. For clarity, the shutter actuation arm of the sliding member is not shown.
Figure 23:
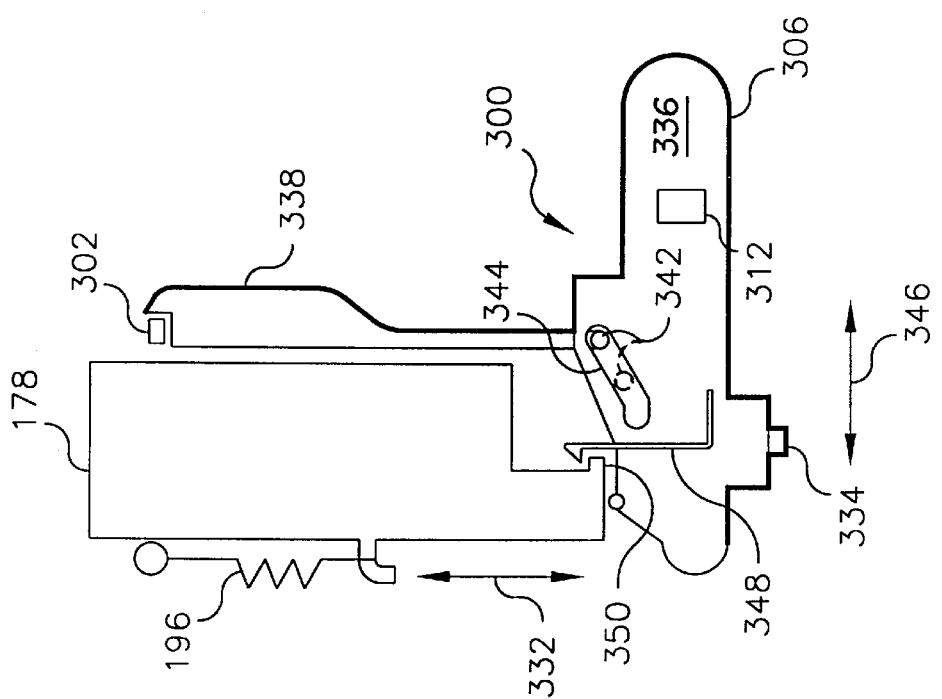
FIG. 23 is a semi-diagrammatical view of an embodiment of the invention illustrating the timer. Shown are the sliding member, biasing member, timer linkage, holdfast, gear train boss, and the contact surface of the shutter release; shown, in solid lines with the sliding member in the second position, the shutter release in a stopped position, and the linkage in the start configuration. The location of the follower of the stop, when the linkage is in an exposure configuration is indicated by dashed lines. For clarity, the timer release are is not shown.

Referring to FIGS. 23–24, the shutter release 302 is mounted in the camera body and is movable from an initial position to a stopped position and from the stopped position to the released position. The shutter release 302 is detained in the initial position by the shutter actuation arm 182 (not shown in FIG. 24) when the sliding member 178 is in the first position. The shutter release 302 is released from the shutter actuation arm 182 when the sliding member 178 is in the second position. The shutter release 302 is biased toward the released position. The shutter release 302 can be a high energy lever, that is, a pivotable mechanical element that is spring-biased by a spring element 324, toward the released position. The high energy lever is thus fully charged in the initial position.

Referring now primarily to FIGS. 23–32, the linkage 306 moves, in synchronism with the delay counter 304. The linkage 306 is mechanically coupled to the gear train 314 for movement with the gear train 314 from a start configuration to an exposure configuration and from the exposure configuration to an end configuration.

Referring now primarily to FIGS. 23–24, 26–27, and 30–31 a boss 334 protrudes from the input gear unit 318 and engages a matching hole (not shown) in the guide plate 336 of the linkage 306. The boss 334 can include a roller bearing or the like to reduce friction. In this embodiment, the winder 312 is a protrusion that is fixed to the guide plate 336 and the unwound and wound positions of the winder 312 correspond to linkage 306 start and end configurations, respectively. The start and end configurations of the linkage 306 are defined by margins 337 of the timer frame 308, that engage the boss 334 in the start and end configurations (the location of the boss 334 in the start configuration is indicated, in FIG. 26, by a circled "X" bearing reference numeral 335) and deter further movement of the linkage 306 in opposed winding and unwinding directions.

The linkage 306 has a stop 338 that is disposed to arrest the shutter release 302 when the linkage 306 is in the start configuration and the shutter release 302 is in the stopped position, and to be free of the shutter release 302 when the linkage 306 is in the end or exposure configuration. The stop 338 has a contact surface 340 at one end and a follower 342 at the other end. The contact surface 340 abuts the shutter release 302 when the shutter release 302 is in the stopped position and prevents the shutter release 302 from continuing resiliently urged movement to the end position. The follower 342 is trapped within a track 344 in the guide plate 336 and moves along the track 344 in unison with the movement of the guide plate 336 and gear train 314. Motion of the guide plate 336 is limited by appropriate guides. For example, referring to FIGS. 23–24, slot 333 in the guide plate 336 and matching guide pin 335 on the frame limit the guide plate 336 to substantially linear movement in the directions indicated by double-headed arrow 346. The stop 338 moves in parallel with the direction of motion of the sliding member, indicated by double-headed arrow 332. The track 344 extends, at least in part, oblique to that direction. As the follower 342 moves along the track 344, the obliquity causes the stop to move in a direction indicated by arrow 332. In addition to the oblique portion of the track, the guide plate 336 can have one or more portions parallel to the direction indicated by arrow 346, if it is desired to provide for additional travel of guide plate 336 unaccompanied by simultaneous movement of the stop 338.

The timer includes a holdfast 348 that grips the sliding member 178 when the sliding member 178 is in the second position and the linkage 306 is in one of the start and exposure configurations, and is released from the sliding member 178 when the linkage 306 is in the end configuration. FIG. 23 shows the position of the holdfast 348 when the sliding member 178 is in the second position. The holdfast 348 is fixed to the timer frame 308 (this is shown mostly clearly in FIG. 32) and is resiliently pivotable relative to the timer frame 308. The holdfast can, for example, be a thin piece of flexible metal. The sliding member 178 has a tab 350 that is configured so as to engage a grip portion 352 of the holdfast 348 when the grip portion 352 and tab 350 are brought together. The tab 350 is released from the holdfast 348 when, as the guide plate 336 moves toward the end configuration, a projection 354 of the guide plate 336 encounters the holdfast 348 and resiliently bends the holdfast 348 away from the tab 350. As a result, timer operation provides a dwell time period between picture exposure, that is, movement of the shutter release 302 to the end position; and spring-biased return of the sliding member 178 to the first position. The number of parts moving during picture exposure is reduced, decreasing the risk of deleterious vibration during picture exposure. The dwell time period can also be utilized in controlling electrical functions of the camera. Wiper elements 188 and contact pads 190 can be configured to use the dwell time period for prolonged actuation of electrical features. For example, the red eye reduction lamp 26 can be actuated during the dwell time period as an indicator to the camera user that timed exposure operation is not yet completed. Similarly, a flash unit can be charged or maintained in an operational condition during the dwell time period. Optical fat bit writers and date-backs can be actuated in the same manner during the dwell time period.

Figure 25:
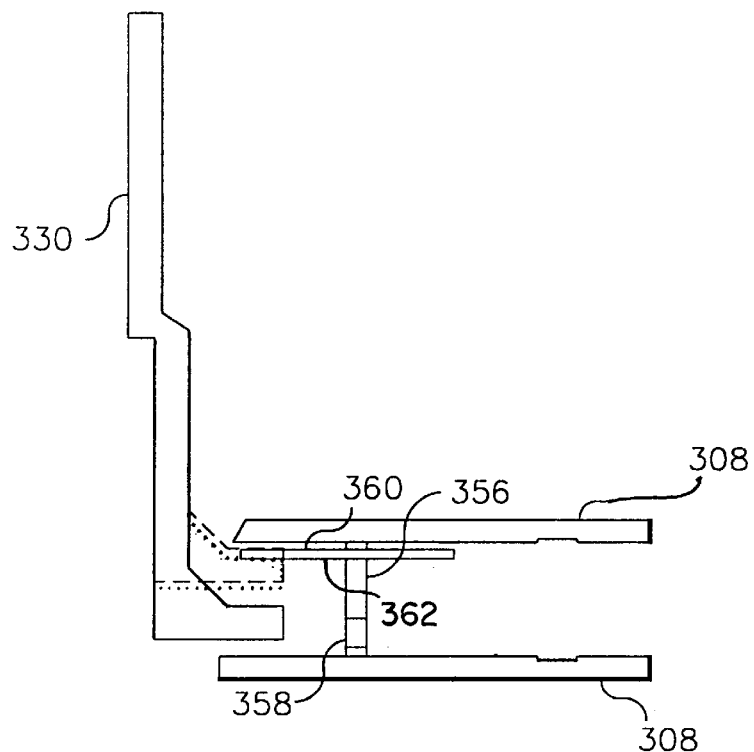
FIG. 25 is a semi-diagrammatical side view of the timer release arm and the timer of the camera of FIG. 23. The timer release arm is shown by a solid line in the second position, by a dashed line in the first position, and by a dotted line in the offset position. The intermediate gear unit is shown by a solid line, in the location the intermediate gear unit occupies when the timer release arm is in the second position or offset position. The remainder of the gear train is not shown.
Figure 26:
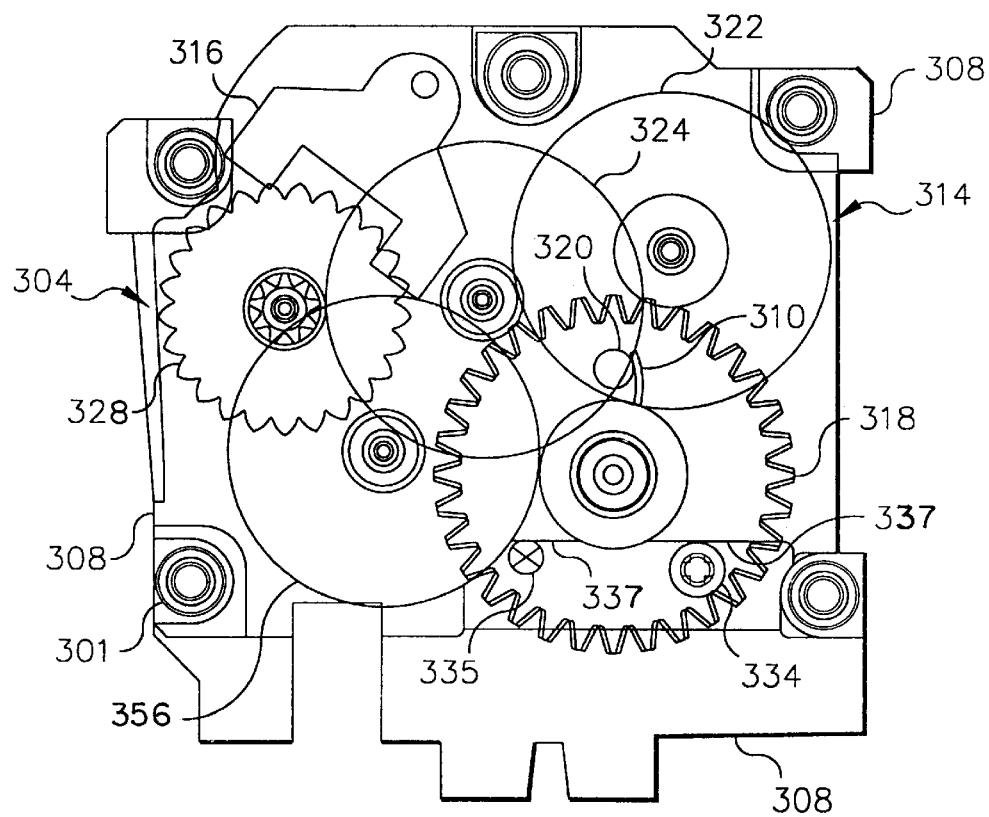
FIG. 26 is a semi-diagrammatical horizontal cross-section through the timer of FIG. 23. The linkage is not shown, except for the gear train boss. The timer is shown in the end configuration. The location of the gear train boss in the start configuration is indicated by an "X" within a circle.
Figure 27:
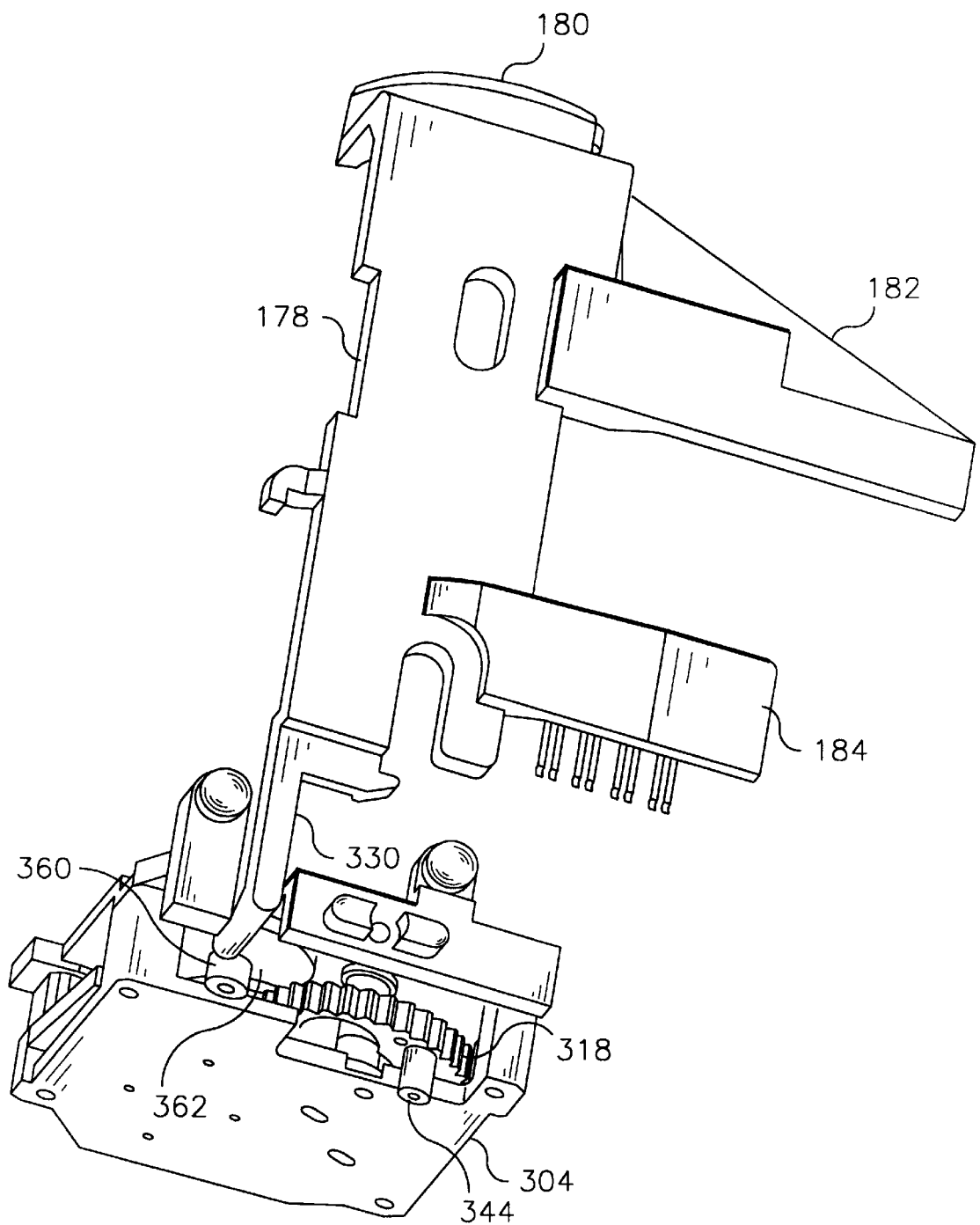
FIG. 27 is a bottom perspective view of the sliding member and timer of FIG. 23. The linkage is not shown.
Figure 28:
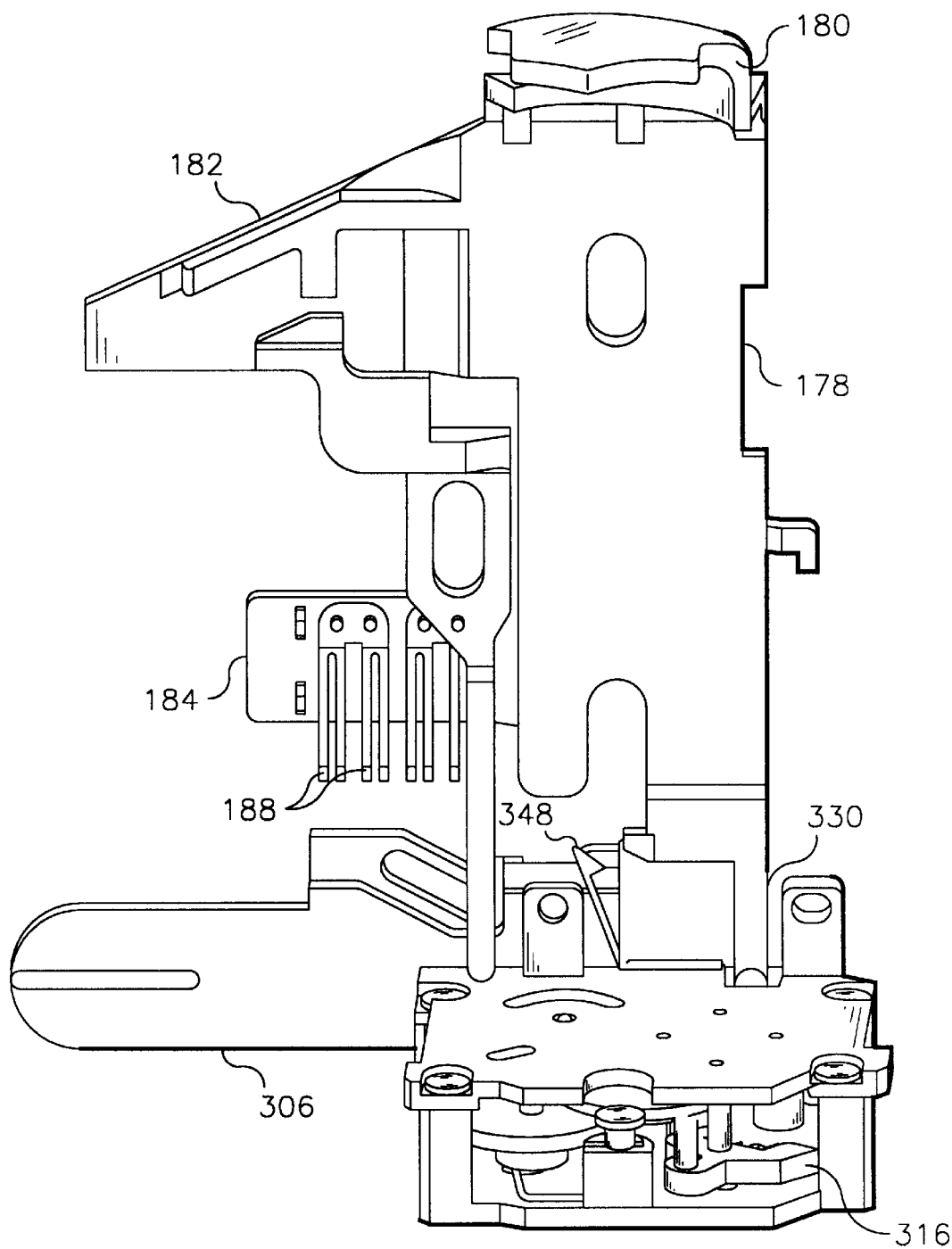
FIG. 28 is a rear perspective view of the sliding member and timer of FIG. 27.
Figure 29:
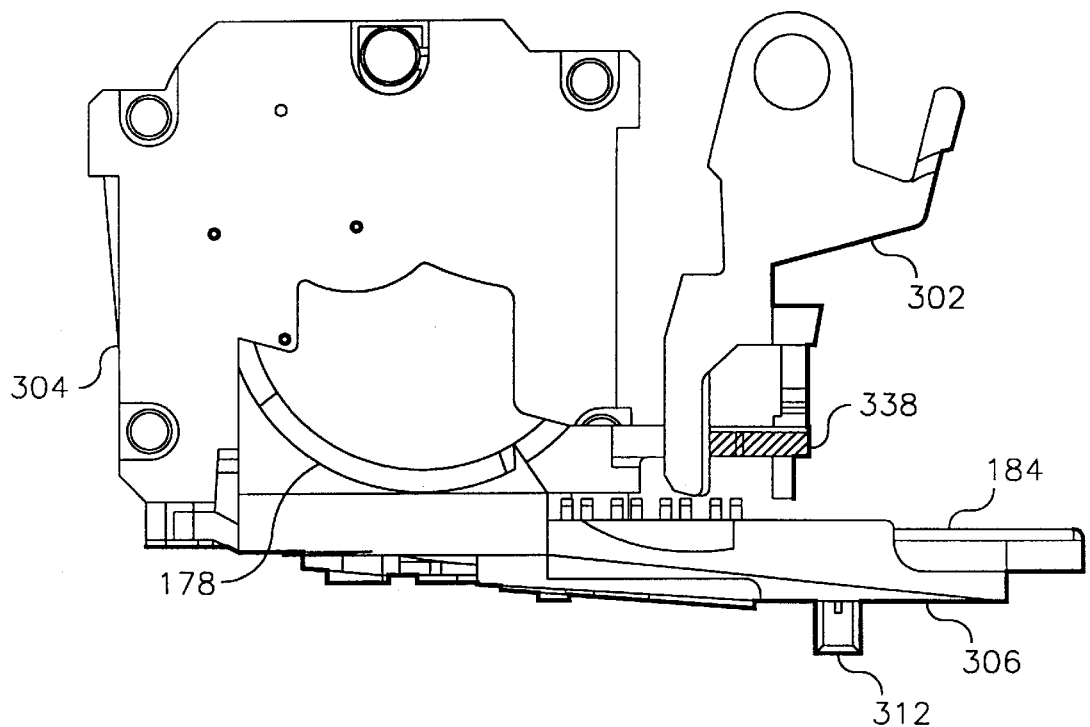
FIG. 29 is a top view of the sliding member and timer of FIG. 27.

The timer 300 is actuated and deactuated by the timer release arm 330. The timer release arm 330 is preferably an arm of the sliding member 178 and moves between the same first and second positions as the sliding member 178. Referring now particularly to FIGS. 25–27, the timer release arm 330 actuates and deactuates the timer by halting the intermediate gear unit 356 of the gear train 314 or allowing the intermediate gear unit 356 to move. (With a mechanical timer the timer is necessarily wound as a preliminary to actuation.)

Referring now particularly to FIGS. 25, and 26 in a particular embodiment, an intermediate gear unit 356 (one of the downstream gear units 322,324,326 of the gear train 314) has a lower mechanical advantage than the input and output gear units 318, 328 in the sequence of gear units. The intermediate gear unit 356 has a minor gear 358 and a major gear 360 having a great number of teeth. An example of a suitable intermediate gear unit 356 has a major to minor gear tooth ratio of 100:1 or greater. A preferred ratio is 200:1 or greater, and a still more preferred ratio is 400:1. The low mechanical advantage of the intermediate gear unit 356 allows the timer release arm 330 to stall the gear train 314 using a small force by contacting the intermediate gear unit 356. In view of the small teeth on the major gear 360, it is desirable that the timer release arm 330 contact the intermediate gear unit 356 on a contact surface 362 (shown in FIG. 27) that is spaced apart from the teeth of the gear unit. The contact between the timer release arm 330 and contact surface 362 can be limited to a minimal force required to provide necessary friction. It is preferred, however, that the be sufficient to clamp the intermediate gear unit 356 between the timer release arm 330 and the timer frame 308. This is illustrated in FIGS. 25 and 26. The timer release arm 330 and intermediate gear unit are shown in solid lines in the locations assumed when -the sliding member 178 is in a second position. The timer release arm 330 is displaced from the intermediate gear unit 356. The dashed line shows the location of the timer release arm 330 when the linkage 306 is in the start configuration and the timer release arm 330 is in the first position. It is not illustrated, but the intermediate gear unit 356, in this case, is displaced or deformed, or both; such that the major gear 360 is clamped between the timer release arm 330 and the adjoining portion of the timer frame 308. The actual distortion of the intermediate gear unit 356 is small, and can be readily accommodated by appropriate tolerances in the timer frame 308 or use of slightly flexible material for the intermediate gear unit 356, or both. When clamped, the gear train 314 is unlikely to move even when the camera is jarred.

Figure 32:
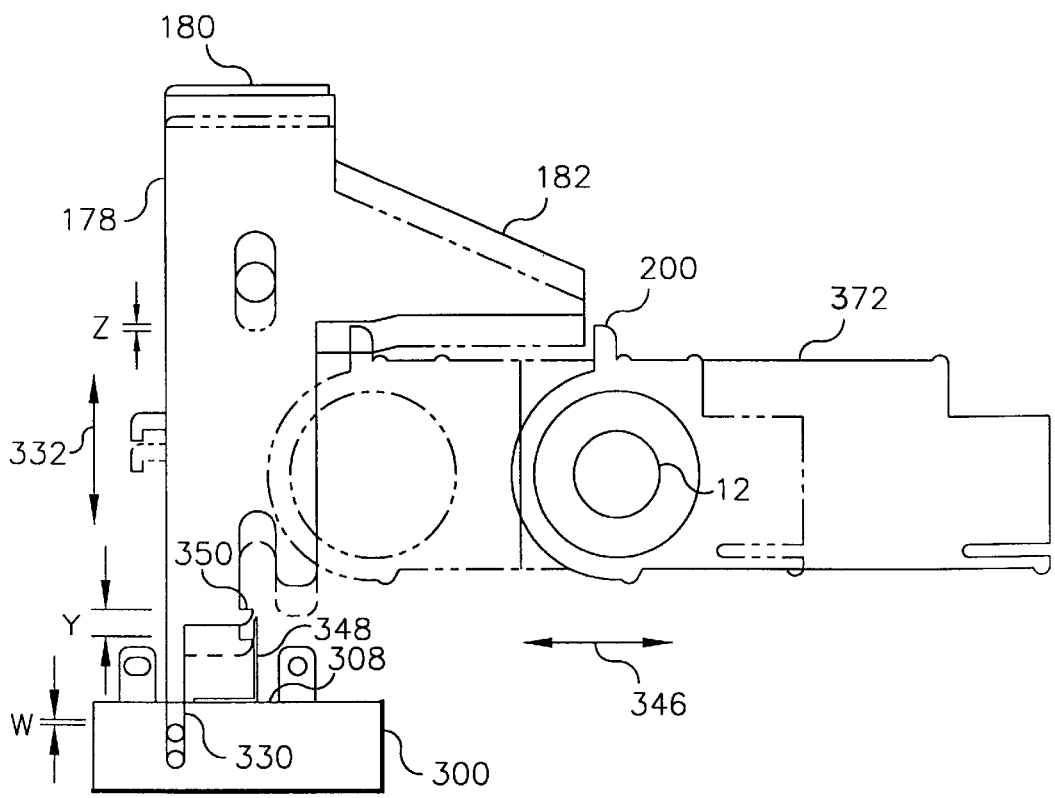
FIG. 32 is a semi-diagrammatical view of the sliding member, timer, and lens cover push-pull of the camera of FIG. 27. The sliding member is shown in the first and second positions by solid and dashed lines, respectively.
Figure 30:
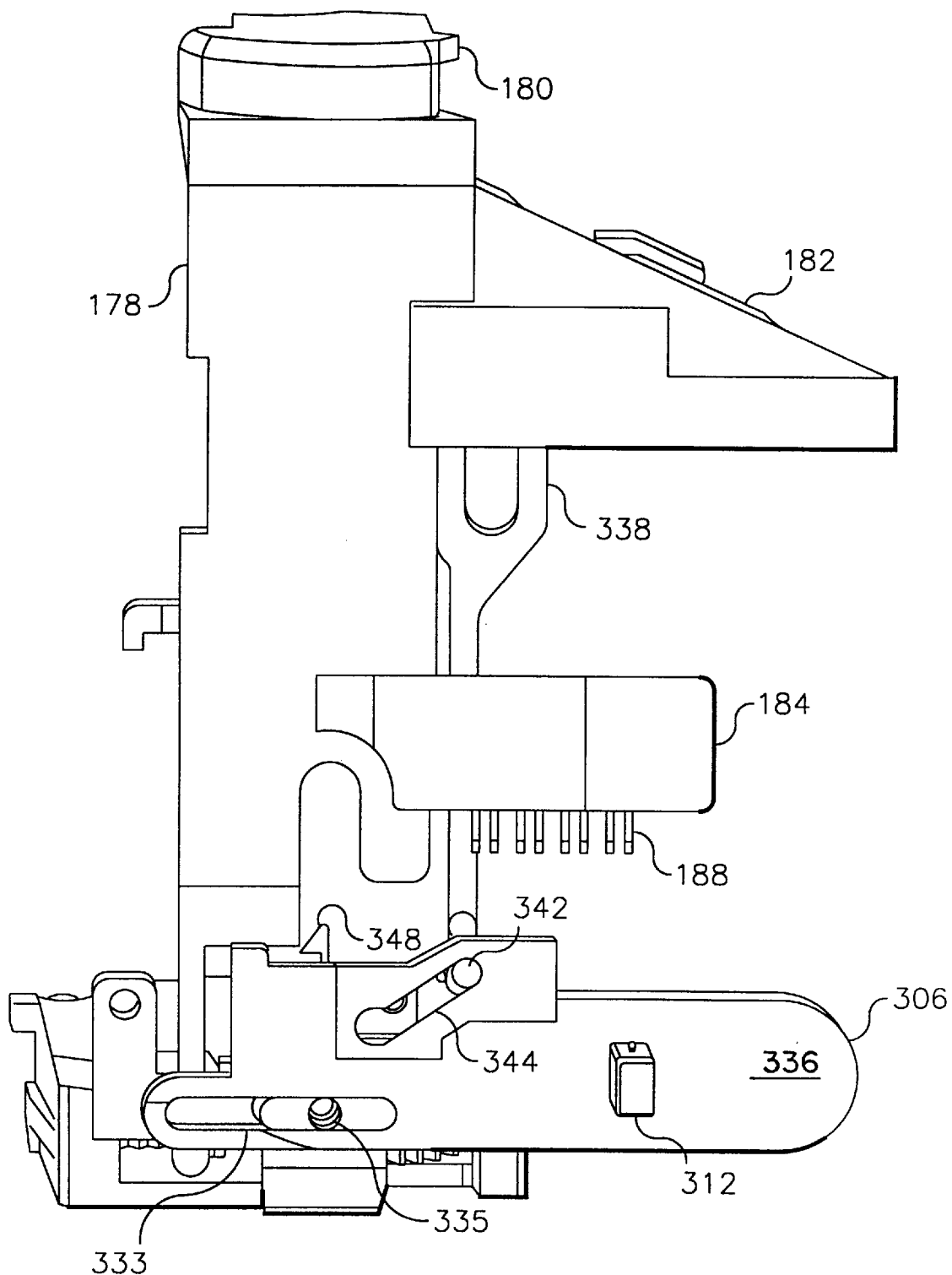
FIG. 30 is a front perspective view of the sliding member and timer of FIG. 27. The sliding member in the second position and the linkage is in the start configuration.
Figure 31:
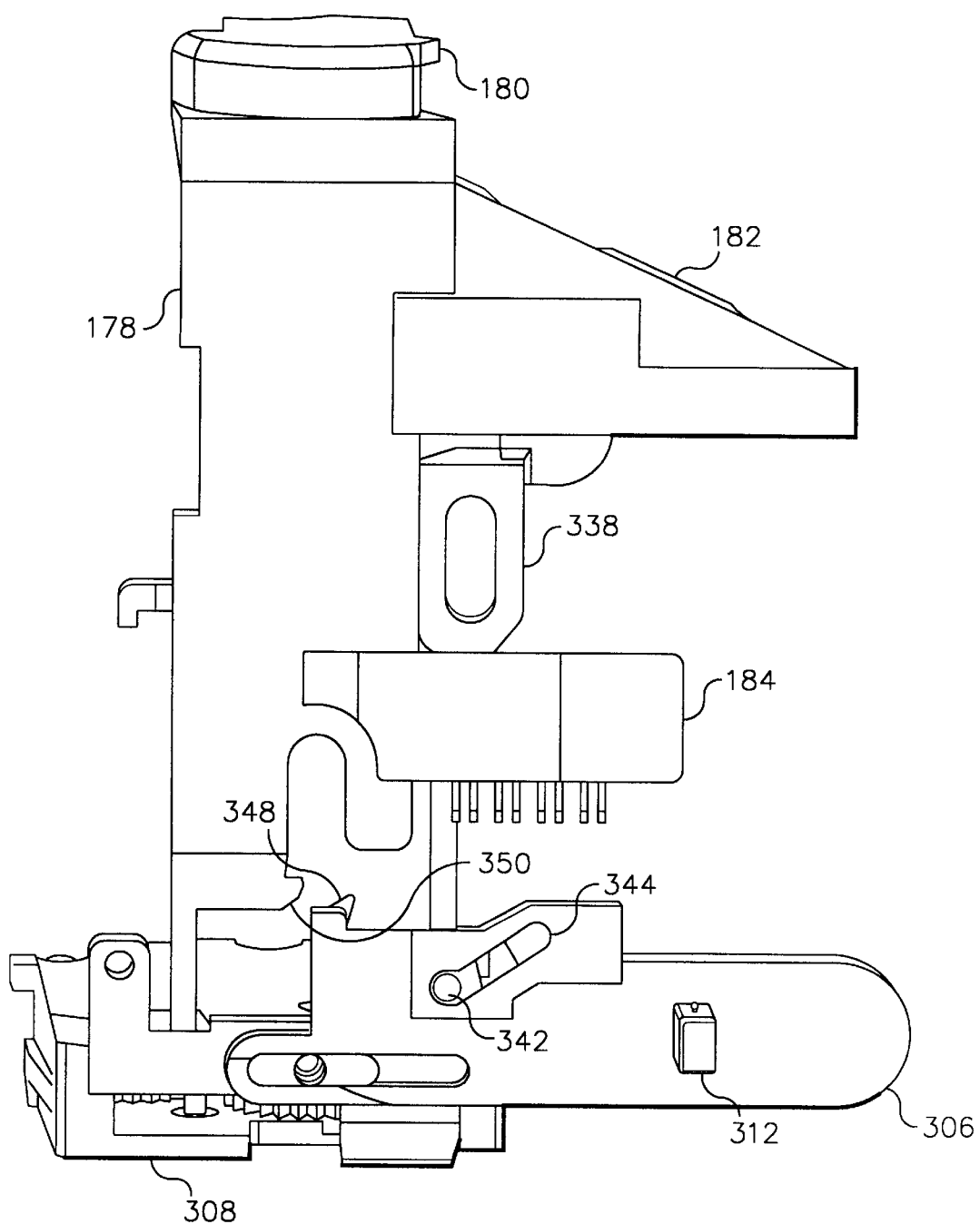
FIG. 31 is the same view as FIG. 30, but the sliding member is in the first position and the linkage is in the end configuration.

Referring now particularly to FIG. 32, a push-pull 372 is movable between a primary position and a secondary position in directions indicated by double-headed arrow 346. These directions are substantially perpendicular to the directions of movement of the sliding member 178, as shown by double-headed arrow 332. The push-pull 372 in the embodiment shown in the figures is a sliding lens cover assembly 24; however, the push-pull can be any of a variety of appropriately positioned and sized camera elements movable, by the user, in a similar manner. For example, the push-pull can be a toggle or a slidable front cover member. It is preferred that the push-pull be movable to cover the taking lens, because this provides a very clear indication to the camera user as to when the push-pull is in a non-picture-taking position. For convenience in the following, the push-pull 372 described is a lens cover assembly. The push-pull 372 has an exterior portion that is movable back and forth by the camera user. The push-pull 372 has a circular opening 362 that unblocks the taking lens 12 when the push-pull 372 is in a primary position and blocks the taking lens 12 when the push-pull 372 is in a secondary position. The push-pull 372 has a shutter lock member 200 that prevents movement of the sliding member 178 from the first position to the second position when the push-pull 372 is in the secondary position, by interfering with the shutter actuation arm 182.

In a particular embodiment, the push-pull 372 is separated from the sliding member 178 in a direction parallel to arrow 332 by a dimension "Z" when the sliding member 178 is in the first position and the push-pull 372 is in the secondary position. In this embodiment, the first and second positions of the sliding member 178 are spaced apart, in a direction parallel to arrow 332, by a dimension "Y".

When the push-pull is in the secondary position, the sliding member 178 is movable out of the first position, over the distance "Z" to an offset position. This movement of the sliding member 178 from the first position to the offset position is insufficient to allow the shutter release 302 to move out of the initial position or to latch the tab 350 to the holdfast 348. This movement of the sliding member 178 from the first position to the offset position is sufficient to actuate the timer, allowing the timer to unwind without requiring a picture exposure. This allows the camera user to deactuate the timer 300 without exposing a frame of film. The movement of the sliding member 178 from the first position to the offset position can be provided by the user pressing on sliding member 178 or can occur automatically, due to appropriately placed guide surfaces, when the lens cover is moved to the secondary position. In a particular embodiment, the timer 300 has a low mechanical advantage intermediate gear unit 360 and the timer release arm is sufficiently displaced from the intermediate gear unit to permit free motion if separated by a dimension "W", which is the same size as, or preferably, smaller than dimension "Z". Examples of suitable dimensions are: "Z"=0.5 mm, "Y"=1.8 mm, and "W"=0.3 mm.

The invention has been described in detail with particular reference to certain preferred embodiments thereof, but it will be understood that variations and modifications can be effected within the spirit and scope of the invention.

What is claimed is:

1. A camera comprising:
   a camera body;
   a shutter release disposed in said camera body, said shutter release being movable from a stopped position to a released position, said shutter release being biased toward said released position;
   a mechanical timer including
      a spring,
      a winder mechanically connected to said spring, said winder being movable into a wound position to load said spring,
      a gear train including input, output, and intermediate gear units, said input gear unit being driven by said spring, said intermediate gear unit being disposed in mechanical sequence between said input and output gear unit,
      an escapement driven by said output gear unit,
      a linkage coupled to said gear train for movement with said gear train between a start configuration and an end configuration, said linkage having a stop, said stop being disposed to arrest said shutter release when said linkage is in said start configuration and said shutter release is in said stopped position, said stop being free of said shutter release when said linkage is in said end configuration; and
   a timer release arm disposed in said camera body, said timer release arm being movable between a first position and a second position, said timer release arm stalling said intermediate gear unit when said linkage is in said start configuration and said timer release arm is in said first position, said timer release arm being displaced from said intermediate gear unit when said timer release arm is in said second position.

2. The camera of claim 1 wherein said intermediate gear unit has a major gear and a minor gear, each said gear having a plurality of teeth, and said intermediate gear unit has a contact surface spaced apart from said teeth; and said timer release arm is in frictional contact with said contact surface when said linkage is in said start configuration and said timer release arm is in said first position.

3. The camera of claim 2 wherein said timer includes a frame supporting said spring, winder, gear train, escapement, and linkage; and said timer release arm clamps said intermediate gear unit between said timer release arm and said frame when said linkage is in said start configuration and said timer release arm is in said first position.

4. The camera of claim 3 further comprising a sliding member mounted in said camera body, said sliding member including a shutter button arm, a shutter actuation arm, and said timer release arm, said sliding member being moveable from a first position to a second position by application of a force to said shutter button arm.

5. The camera of claim 4 further comprising a biasing member biasing said sliding member for return from said second position to said first position.

6. The camera of claim 1 wherein said intermediate gear unit has a major gear and a minor gear, said major and minor gears having a tooth ratio of greater than 100:1.

7. The camera of claim 1 wherein said intermediate gear unit has a major gear and a minor gear, said major and minor gears having a tooth ratio of greater than 200:1.

8. The camera of claim 1 wherein said intermediate gear unit has a major gear and a minor gear, said major and minor gears having a tooth ratio of greater than 400:1.

9. The camera of claim 1 further comprising a sliding member mounted in said camera body, said sliding member including a shutter button arm, a shutter actuation arm, and said timer release arm, said sliding member being moveable from a first position to a second position by application of a force to said shutter button arm.

10. The camera of claim 9 further comprising a biasing member biasing said sliding member for return from said second position to said first position.

11. The camera of claim 9 wherein said camera further comprises a plurality of contact pads fixed within said camera body and said sliding member includes an electrical contact arm having a plurality of electrical contact elements, said electrical contacts being disposed to individually engage respective said contact pads when said sliding member is in one of said first position, said second position, and a plurality of positions intermediate between said first and second positions.

12. The camera of claim 9 wherein said shutter release is movable from said initial position to a stopped position and from said stopped position to said released position, said shutter release being detained in said initial position by said shutter actuation arm when said sliding member is in said first position, said shutter release being released from said shutter actuation arm when said sliding member is in said second position.

13. The camera of claim 12 wherein said shutter release is a mechanical member which is fully charged in said initial position.

14. A mechanism comprising:
- a shutter release movable from a stopped position to a released position, said shutter release being biased toward said released position;
- a mechanical timer including:
  - a frame;
  - a spring mounted on said frame;
  - a winder mechanically connected to said spring, said winder being movable into a wound position to load said spring;
  - a gear train including input, output, and intermediate gear units, said input gear unit being driven by said spring, said intermediate gear unit being disposed in mechanical sequence between said input and output gear units;
  - an escapement driven by said output gear unit;
  - a linkage coupled to said gear train for movement with said gear train, relative to said frame, between a start configuration and an end configuration, said linkage having a stop, said stop being disposed to arrest said shutter release when said linkage is in said start configuration and said shutter release is in said stopped position, said stop being free of said shutter release when said linkage is in said end configuration; and
- a timer release arm disposed in said frame, said timer release arm being movable between a first position and a second position, said timer release arm stalling said intermediate gear unit when said linkage is in said start configuration and said timer release arm is in said first position, said timer release arm being displaced from said intermediate gear unit when said timer release arm is in said second position.

15. The mechanism of claim 14 wherein said intermediate gear unit has a major gear and a minor gear, each said gear having a plurality of teeth, and said intermediate gear unit has a contact surface spaced apart from said teeth; and said timer release arm is in frictional contact with said contact surface when said linkage is in said start configuration and said timer release arm is in said first position.

16. The mechanism of claim 14 wherein said intermediate gear unit has a major gear and a minor gear, said major and minor gears having a tooth ratio of greater than 100:1.

17. The mechanism of claim 14 wherein said intermediate gear unit has a major gear and a minor gear, said major and minor gears having a tooth ratio of greater than 200:1.

18. The mechanism of claim 14 wherein said intermediate gear unit has a major gear and a minor gear, said major and minor gears having a tooth ratio of greater than 400:1.

* * * * *